US008734216B2

(12) United States Patent
Sato

(10) Patent No.: US 8,734,216 B2
(45) Date of Patent: May 27, 2014

(54) VIDEO GAME PROCESSING APPARATUS, A METHOD AND A COMPUTER PROCESSING A VIDEO GAME

(75) Inventor: Yasuhiro Sato, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 2043 days.

(21) Appl. No.: 11/740,041

(22) Filed: Apr. 25, 2007

(65) Prior Publication Data

US 2007/0265046 A1 Nov. 15, 2007

(30) Foreign Application Priority Data

Apr. 28, 2006 (JP) .................. 2006-126598

(51) Int. Cl.
*A63F 9/24* (2006.01)
(52) U.S. Cl.
USPC ................................. 463/8; 463/31
(58) Field of Classification Search
CPC .................................... A63F 2300/65
USPC ...................... 463/1, 8, 30, 31, 32
See application file for complete search history.

(56) References Cited

U.S. PATENT DOCUMENTS

| 6,149,523 | A | 11/2000 | Yamada et al. | |
|---|---|---|---|---|
| 6,354,940 | B1 * | 3/2002 | Itou et al. | 463/8 |
| 6,488,586 | B1 * | 12/2002 | Kobayashi et al. | 463/43 |
| 7,066,817 | B2 | 6/2006 | Sato | |
| 2003/0013508 | A1 | 1/2003 | Sato | |

| 2004/0259613 | A1 | 12/2004 | Machida |
|---|---|---|---|
| 2005/0054402 | A1 | 3/2005 | Noguchi et al. |
| 2005/0143173 | A1 | 6/2005 | Barney et al. |

FOREIGN PATENT DOCUMENTS

| EP | 1587034 | 10/2005 |
|---|---|---|
| JP | 06-105959 | 4/1994 |
| JP | 11-300044 | 11/1999 |
| JP | 2000-70550 | 3/2000 |
| JP | 2003-144749 | 5/2003 |
| JP | 2004-230179 | 8/2004 |

OTHER PUBLICATIONS

English language Abstract of JP 06-105959.
English language Abstract of 11-300044, Nov. 2, 1999.
English language Abstract of 2000-70550, Mar. 7, 2000.
English language Abstract of 2004-230179, Aug. 19, 2004.
English language Abstract of 2003-144749, May 20, 2003.

(Continued)

*Primary Examiner* — Damon Pierce
(74) *Attorney, Agent, or Firm* — Greenblum & Bernstein, P.L.C.

(57) ABSTRACT

A predetermined time point is added to an accumulated value of the time point in accordance with lapse of time. A special effect and a special effect applied value set to the special effect are stored when specification of the special effect is received. When the special effect applied value is subtracted from the accumulated maximum value of the time point, the special effect is applied to the player character. When specification of action commands is received, the received action command, an action command value and a received order of the action command are stored. The action command whose received order is the earliest among the received action commands is activated in the case where the accumulated value of the time point is the action command value of the action command or more. The action command value of the activated action command is subtracted from the time point.

12 Claims, 16 Drawing Sheets

(56) References Cited

OTHER PUBLICATIONS

"ENIX Best Mook Library Star Ocean Till the End of Time Official Guidebook First Edition", first impression of the first edition, ENIX Co., Ltd, Mar. 20, 2003, pp. 014-019.

"V Jump Books Play station 2 version Final Fantasy XII First Flight Guide", first impression, Shueisha Inc., Mar. 21, 2006, pp. 070-087, 177-179.

Final Fantasy XI Online Vana'diel World Report Version.021002, first edition, DigiCube Co., Ltd., Nov. 2002, pp. 064-065, 322.

Extended European Search Report from EPO in European Application No. 07008565, mail date is Dec. 19, 2011.

Office Action from European Patent Office (EPO) in European Patent Application No. 07008565.9, dated May 15, 2013.

Extended European Search Report from the EPO in European Patent Application No. 12177654.6, dated Sep. 20, 2012.

\* cited by examiner

| ABILITY NAME | EFFECT | CONSUMED ATB VALUE |
|---|---|---|
| AUTO-ABILITY 1 | OFFENSIVE POWER : TWICE | 40 |
| AUTO-ABILITY 2 | OFFENSIVE POWER : 1.5 TIMES | 20 |
| AUTO-ABILITY 3 | OFFENSIVE POWER : 10 POINTS UP | 10 |
| AUTO-ABILITY 4 | DEFENSIVE POWER : TWICE | 40 |
| AUTO-ABILITY 5 | DEFENSIVE POWER : 1.5 TIMES | 20 |
| AUTO-ABILITY 6 | DEFENSIVE POWER : 10 POINTS UP | 10 |

| COMMAND NAME | COMMAND VALUE | CATEGORY | ACQUIRED LEVEL | ACQUIRED FLAG |
|---|---|---|---|---|
| MAGIC 1 | 20 | MAGIC | 1 | 1 |
| MAGIC 2 | 30 | MAGIC | 2 | 1 |
| MAGIC 3 | 50 | MAGIC | 4 | 0 |
| BATTLE 1 | 40 | NORMAL SKILL | 1 | 1 |
| BATTLE 2 | 30 | NORMAL SKILL | 1 | 1 |
| BATTLE 3 | 20 | NORMAL SKILL | 1 | 1 |
| MAGIC 4 | 30 | MAGIC | 3 | 0 |
| MAGIC 5 | 60 | MAGIC | 4 | 0 |

VIDEO GAME PROCESSING APPARATUS, A METHOD AND A COMPUTER PROCESSING A VIDEO GAME

CROSS-REFERENCE TO RELATED APPLICATION

The present disclosure relates to subject matter contained in Japanese Patent Application No. 2006-126598, filed on Apr. 28, 2006, the disclosure of which is expressly incorporated herein by reference in its entirety.

BACKGROUND OF THE INVENTION

1. Field of the Invention

The present invention relates to a technique for controlling progress of a video game by displaying a player character on an image display screen of an image display apparatus, and by controlling an action of the characters displayed on the image display screen in response to operation(s) by a player.

2. Description of the Related Art

Various kinds of so-called role playing games (RPG; that is, a game in which a player plays a role of a character in a world of the game, and accomplishes a predetermined object while enjoying a process that the character grows through various experiences) have been provided.

Part of the appeal of a RPG is generally a scene in which a player character acting in response to operations by the player executes a battle against an enemy character thwarting accomplishment of a predetermined object in the RPG. However, in a conventional battle scene, actions of the player character and the enemy character are alternately executed one by one. For this reason, realism (realistic sensation) of an action scene (in particular, a battle scene) was low.

In order to solve the problem, Japanese Patent Application Publication No. 6-105959 discloses that an enemy character attacks a game character when specific setting time for the enemy character elapses without stopping lapse of time even while the player inputs a command for the game character. Specifically, in this patent application publication, it is adopted a gauge filling in accordance with lapse of time during a battle between the game character and the enemy character. The player can input a command for the game character when the gauge is full. Thus, realism (realistic sensation) of a battle scene is improved.

However, in the invention disclosed in Japanese Patent Application Publication No. 6-105959, the player is required to wait until a gauge is filled up in order to input a command. In this case, for example, in the case where a simple command such as "defense" is to be activated, or in the case where a so-called "special weapon" having the high degree of difficulty and great destructive power is to be activated, time to fill the gauge up is the same as each other. Further, a player character cannot attack an enemy character continuously or sequentially. Moreover, commands cannot be combined. For this reason, realism (realistic sensation) of a video game is lowered, and such a video game lowers or reduces interest of the player in the video game.

Heretofore, as a method of improving ability (such as offensive power and defensive power) of a player character in a video game, it has been adopted a method of applying accessories and/or items whose ability can be changed. However, since the player character can obtain such an accessory or an item only in a specific scene (for example, the player discovers it on its way of progress of the video game, or the player character clears a predetermined mission), this technique causes lack of interest of the player in the video game.

SUMMARY OF THE INVENTION

It is one object of the present invention to solve the problems described above and to provide a video game processing apparatus, a method and a computer program product for processing a video game by which it is possible to improve realism (realistic sensation) in a battle scene of a RPG game (video game), and this makes it possible to improve interest in the RPG game of a player. In this case, points (time) required to activate a command can be changed in accordance with the degree of difficulty and/or destructive power (or recovery power) of the command to be activated, and a plurality of commands can be specified at once in the case where the total amount of the points required to activate (or issue) the commands falls within the points filled in a gauge.

In order to achieve the above object, one aspect of the present invention is directed to a video game processing apparatus that causes an image display apparatus to display a player character on an image display screen of the image display apparatus. The video game processing apparatus controls progress of the video game by controlling an action of the player character to be displayed on the image display screen in accordance with operations by a player. The video game processing apparatus of the one embodiment includes a time point adder that adds a predetermined time point to an accumulated value of the time point in accordance with lapse of time.

The video game processing apparatus also includes an accumulated time point display controller that causes the image display apparatus to display the accumulated value of the time point and an accumulated maximum value of the time point on the image display screen.

The video game processing apparatus also includes a special effect specification receiver that receives specification of a special effect on condition that the accumulated maximum value of the time point is caused to be lowered, the special effect being applied to the player character.

The video game processing apparatus also includes a received special effect memory that stores the special effect received by the special effect specification receiver and a special effect applied value so that the received special effect corresponds to the special effect applied value, the special effect applied value being set to the special effect.

The video game processing apparatus also includes an accumulated maximum value subtracter that subtracts the special effect applied value set to the received special effect from the accumulated maximum value of the time point when the special effect specification receiver receives the specification of the special effect.

The video game processing apparatus also includes a special effect applier that applies the special effect to the player character in the case where the special effect specification receiver receives the specification of the special effect.

The video game processing apparatus also includes an action command receiver capable of sequentially receiving specification of a plurality of action commands for specifying an action of the player character.

The video game processing apparatus also includes an action command memory that stores the action command received by the action command receiver, an action command value set to the action command and a received order of the action command so as to correspond to each other.

The video game processing apparatus also includes an action command activator that monitors the accumulated value of the time point, the action command activator activating the action command whose received order is the earliest among the received action commands in the case where the accumulated value of the time point is the action command value of the action command or more.

The video game processing apparatus also includes a time point subtracter that subtracts the action command value of the activated action command from the time point in the case where the action command activator activates the action command.

Since the video game processing apparatus may have a configuration as described above, by comparing a time point added in accordance with lapse of time with an action command value set to each of the selected and stored action commands, it is possible to activate the stored action commands when the time point becomes the action command value of the action command whose received order is the earliest or more, and it is possible to subtract the action command value from the time point. Namely, since the time points required to activate a command (that is, lapse of time) is differentiated for every action command, it is possible to heighten realism (realistic sensation) of the video game, and it is possible to improve interest in the video game. In addition, since the accumulated and stored action commands are activated, it is possible to execute the action commands in combination and sequentially. For this reason, since the player is required to constantly calculate the action command values and/or the accumulated value of the time points and to select and specify the action commands, it is possible to increase interest in the video game. Further, it is possible to apply a special effect to the player character on condition that the accumulated maximum value of the time point is subtracted. This makes it possible to widen variety of the video game, and to improve interest of the player in the video game.

In another embodiment of the present invention, the video game processing apparatus includes a time point adder that adds a predetermined time point to an accumulated value of the time point in accordance with lapse of time.

The video game processing apparatus also includes an accumulated time point display controller that causes the image display apparatus to display the accumulated value of the time point and an accumulated maximum value of the time point on the image display screen.

The video game processing apparatus also includes a special effect specification receiver that receives specification of a special effect on condition that the accumulated maximum value of the time point is caused to be lowered, the special effect being applied to the player character.

The video game processing apparatus also includes a received special effect memory that stores the special effect received by the special effect specification receiver and a special effect applied value so that the received special effect corresponds to the special effect applied value, the special effect applied value being set to the special effect.

The video game processing apparatus also includes an accumulated maximum value subtracter that subtracts the special effect applied value set to the received special effect from the accumulated maximum value of the time point when the special effect specification receiver receives the specification of the special effect.

The video game processing apparatus also includes a special effect applier that applies the special effect to the player character in the case where the special effect specification receiver receives the specification of the special effect.

The video game processing apparatus also includes an action command receiver capable of sequentially receiving specification of a plurality of action commands for specifying an action of the player character.

The video game processing apparatus also includes an action command memory that stores the action command received by the action command receiver, an action command value set to the action command and a received order of the action command so as to correspond to each other.

The video game processing apparatus also includes an action command activator that monitors the accumulated value of the time point, the action command activator sequentially activating the action commands in accordance with received order of the action commands in the case where the accumulated value of the time point is the accumulated value of the action command values of the received action commands or more.

The video game processing apparatus also includes a time point subtracter that subtracts the action command value of the activated action command from the time point in the case where the action command activator activates the action command.

Since the video game processing apparatus may have a configuration as described above, by comparing a time point added in accordance with lapse of time with an accumulated value of action command values of the received action commands, it is possible to activate the received action commands in turn when the time point becomes the accumulated value of the action command value or more, and it is possible to subtract the action command values of the activated action commands from the time point. Namely, since the time points required to activate a command (that is, lapse of time) is differentiated for every action command, it is possible to heighten realism (realistic sensation) of the video game, and it is possible to improve interest in the video game. In addition, since the accumulated and stored action commands are activated in accordance with received order in turn, it is possible to execute the action commands in combination and sequentially. For this reason, since the player is required to constantly calculate the action command values and/or the accumulated value of the time points and to select and specify the action commands, it is possible to increase interest in the video game. Further, it is possible to apply a special effect to the player character on condition that the accumulated maximum value of the time point is subtracted. This makes it possible to widen variety of the video game, and to improve interest of the player in the video game.

It is preferable that the video game processing apparatus further includes an action command activating instruction receiver that receives an instruction to activate an action command on the basis of operations of the player. In this case, the action command activator activates an action command that can be activated in the case where the action command activating specification receiver receives the specification to activate the action command. By constructing the video game processing apparatus as described above, the player can specify timing of activating the action command, and this makes it possible to improve interest in the video game further.

It is preferable that the video game processing apparatus further includes an activation possible indicator that executes indication for informing the player that an action command can be activated in the state where the action command activator can activate the action command. By constructing the video game processing apparatus as described above, it is possible to visually inform the player that the action command can be activated, and this makes it possible to prevent the player from fixing his eyes on numerical information and thereby overlooking the indicated image of the video game for an action of the player character.

In still another embodiment of the present invention, the video game processing apparatus includes a time point adder that adds a predetermined time point to an accumulated value of the time point in accordance with lapse of time.

The video game processing apparatus also includes an accumulated time point display controller that causes the image display apparatus to display the accumulated value of the time point and an accumulated maximum value of the time point on the image display screen.

The video game processing apparatus also includes a special effect specification receiver that receives specification of a special effect on condition that the accumulated maximum value of the time point is caused to be lowered, the special effect being applied to the player character.

The video game processing apparatus also includes a received special effect memory that stores the special effect received by the special effect specification receiver and a special effect applied value so that the received special effect corresponds to the special effect applied value, the special effect applied value being set to the special effect.

The video game processing apparatus also includes an accumulated maximum value subtracter that subtracts the special effect applied value set to the received special effect from the accumulated maximum value of the time point when the special effect specification receiver receives the specification of the special effect.

The video game processing apparatus also includes a special effect applier that applies the special effect to the player character in the case where the special effect specification receiver receives the specification of the special effect.

The video game processing apparatus also includes an action command receiver capable of sequentially receiving specification of a plurality of action commands for specifying an action of the player character.

The video game processing apparatus also includes an action command memory that stores the action command received by the action command receiver and an action command value set to the action command so as to correspond to each other.

The video game processing apparatus also includes an action command activation reserving instruction receiver that receives an instruction to reserve activation of action commands on the basis of operations of the player.

The video game processing apparatus also includes an activation reserving setter that sets reservation to activate one or more action command that has not been reserved to activate yet among the action commands stored in the action command memory when the action command activation reserving instruction receiver receives the instruction to reserve activation of the action commands.

The video game processing apparatus also includes an action command activator that monitors the accumulated value of the time point, the action command activator activating the one or more action command or a special action command of the one or more action command in the case where the accumulated value of the time point is the accumulated value of the action command value of the one or more action command whose activation reserving order is the earliest among the action commands that have already reserved to activate or more, the special action command being determined in accordance with combination of the one or more action command.

The video game processing apparatus also includes a time point subtracter that subtracts the action command value of the activated one or more action command from the time point in the case where the action command activator activates the one or more action command or the special action command.

Since the video game processing apparatus may have a configuration as described above, it is possible to activate the stored action commands first reserved to activate, and it is possible to subtract the accumulated value of the action command values of the action commands reserved to activate from the time point when the time point added in accordance with lapse of time becomes the accumulated value of the action command values of the action commands that have been reserved to activate the earliest among the action commands reserved to activate or more. Namely, it is possible to activate the action commands in group units reserved to activate sequentially, and it is possible to heighten realism (realistic sensation) of the video game, and it is possible to improve interest in the video game. In addition, since the accumulated and stored action commands are reserved and activated, it is possible to execute the action commands in combination and sequentially. For this reason, since the player is required to constantly calculate the action command values and/or the accumulated value of the time points and to select and specify the action commands, it is possible to increase interest in the video game. Further, it is possible to apply a special effect to the player character on condition that the accumulated maximum value of the time point is subtracted. This makes it possible to widen variety of the video game, and to improve interest of the player in the video game.

It is preferable that the video game processing apparatus further includes: an action command selector that selects a receivable action command among a plurality of action commands for specifying an action of the player character on the basis of a predetermined action command selecting condition; and an action command display controller that causes the display apparatus to display a list of a part or all of the selected action command on the image display screen.

It is preferable that the predetermined action command selecting condition includes at least one of two conditions, one of the two conditions being that the action command value, which is a subtracted value obtained by subtracting the accumulated value of the action command value of the received action commands from the accumulated maximum value of the time point or less, is set to the action command, the other condition being that a specification possible state is set to flag information of the action command, the flag information indicating whether or not the action command can be specified for an action of the player character. By constructing the video game processing apparatus as described above, a parameter to limit to selection of the action commands can be determined. Thus, since it is necessary for the player to consider a method of clearing the video game, this makes it possible to improve interest of the player in the video game.

It is preferable that the action command display controller causes the display device to display the action commands in ascending order of the action command value. By constructing the video game processing apparatus as described above, it is possible to display the action commands obviously.

It is preferable that the action command receiver can receive action commands up to a predetermined upper limit number.

It is preferable that the action command receiver determines the predetermined upper limit number of receivable action commands on the basis of at least one of status information of the player character and accumulated execution time of the video game. By constructing the video game processing apparatus as described above, a parameter to determine the upper limit number of the receivable action commands can be determined. Thus, since it is necessary for the player to consider a method of clearing the video game, this makes it possible to improve interest of the player in the video game.

It is preferable that the time point adder determines the predetermined time point to be added on the basis of at least one of status information of the player character and accumulated execution time of the video game. By constructing the video game processing apparatus as described above, a parameter to determine the predetermined time point to be added can be determined. Thus, since it is necessary for the player to consider a method of clearing the video game, this makes it possible to improve interest of the player in the video game. In this regard, the maximum value of the time point that can be accumulated may be changed on the basis of at least one of the status information of the player character and the accumulated execution time of the video game.

It is preferable that the video game processing apparatus further includes: an action command erasing instruction receiver that receives an instruction to erase the action command stored in the action command memory on the basis of operations of the player; and an action command eraser that erases the action command when the action command erasing instruction receiver receives the instruction to erase the action command. By constructing the video game processing apparatus as described above, it is possible to erase the action command, for example, in the case where the player inputs the action command by mistake.

It is preferable that the video game processing apparatus further includes: a special effect terminating instruction receiver that receives an instruction to terminate the special effect applied to the player character on the basis of operations of the player; an accumulated maximum value adder that adds the special effect applied value set to the received special effect to the accumulated maximum value of the time point when the special effect terminating instruction receiver receives the instruction to terminate the special effect; and a special effect eraser that erases the special effect stored in the received special effect memory when the special effect terminating instruction receiver receives the instruction to terminate the special effect. By constructing the video game processing apparatus as described above, it is possible to erase the special effect and restore the accumulated maximum value of the time point, for example, in the case where the player wants to terminate the application of the special effect, in the case where the player inputs the special effect by mistake, or in the case where the player wants to exchange the special effects.

It is preferable that the video game processing apparatus further includes a special effect indicator that executes indication for informing the player that the special effect is applied to the player character when the special effect applier applies the special effect to the player character. By constructing the video game processing apparatus as described above, the player can easily know whether or not the special effect is applied to the player character.

Further, in another aspect of the present invention, the present invention is directed to a method of processing a video game by causing an image display apparatus to display a player character on an image display screen of the image display apparatus. In this case, the method controls progress of the video game by controlling an action of each character to be displayed on the image display screen in accordance with operations by a player. The method of one embodiment includes adding a predetermined time point to an accumulated value of the time point in accordance with lapse of time.

The method also includes causing the image display apparatus to display the accumulated value of the time point and an accumulated maximum value of the time point on the image display screen.

The method also includes receiving specification of a special effect on condition that the accumulated maximum value of the time point is caused to be lowered, the special effect being applied to the player character.

The method also includes storing the received special effect and a special effect applied value so that the received special effect corresponds to the special effect applied value, the special effect applied value being set to the special effect.

The method also includes subtracting the special effect applied value set to the received special effect from the accumulated maximum value of the time point when the specification of the special effect is received.

The method also includes applying the special effect to the player character in the case where the specification of the special effect is received.

The method also includes sequentially receiving specification of a plurality of action commands for specifying an action of the player character.

The method also includes storing the received action command, an action command value set to the action command and a received order of the action command so as to correspond to each other.

The method also includes monitoring the accumulated value of the time point, and activating the action command whose received order is the earliest among the received action commands in the case where the accumulated value of the time point is the action command value of the action command or more.

The method also includes subtracting the action command value of the activated action command from the time point in the case where the action command is activated.

In another embodiment of the present invention, the method includes adding a predetermined time point to an accumulated value of the time point in accordance with lapse of time.

The method also includes causing the image display apparatus to display the accumulated value of the time point and an accumulated maximum value of the time point on the image display screen.

The method also includes receiving specification of a special effect on condition that the accumulated maximum value of the time point is caused to be lowered, the special effect being applied to the player character.

The method also includes storing the received special effect and a special effect applied value so that the received special effect corresponds to the special effect applied value, the special effect applied value being set to the special effect.

The method also includes subtracting the special effect applied value set to the received special effect from the accumulated maximum value of the time point when the specification of the special effect is received.

The method also includes applying the special effect to the player character in the case where the specification of the special effect is received.

The method also includes sequentially receiving specification of a plurality of action commands for specifying an action of the player character.

The method also includes storing the received action command, an action command value set to the action command and a received order of the action command so as to correspond to each other.

The method also includes monitoring the accumulated value of the time point, and sequentially activating the action commands in accordance with received order of the action commands in the case where the accumulated value of the time point is the accumulated value of the action command values of the received action commands or more.

The method also includes subtracting the action command value of the activated action command from the time point in the case where the action command is activated.

In still another embodiment of the present invention, the method includes adding a predetermined time point to an accumulated value of the time point in accordance with lapse of time.

The method also includes causing the image display apparatus to display the accumulated value of the time point and an accumulated maximum value of the time point on the image display screen.

The method also includes receiving specification of a special effect on condition that the accumulated maximum value of the time point is caused to be lowered, the special effect being applied to the player character.

The method also includes storing the received special effect and a special effect applied value so that the received special effect corresponds to the special effect applied value, the special effect applied value being set to the special effect.

The method also includes subtracting the special effect applied value set to the received special effect from the accumulated maximum value of the time point when the specification of the special effect is received.

The method also includes applying the special effect to the player character in the case where the specification of the special effect is received.

The method also includes sequentially receiving specification of a plurality of action commands for specifying an action of the player character.

The method also includes storing the received action command and an action command value set to the action command so as to correspond to each other.

The method also includes receiving an instruction to reserve activation of action commands on the basis of operations of the player.

The method also includes setting reservation to activate one or more action command that has not been reserved to activate yet among the stored action commands when the instruction to reserve activation of the action commands is received.

The method also includes monitoring the accumulated value of the time point, and activating the one or more action command or a special action command of the one or more action command in the case where the accumulated value of the time point is the accumulated value of the action command value of the one or more action command whose activation reserving order is the earliest among the action commands that have already reserved to activate or more, the special action command being determined in accordance with combination of the one or more action command.

The method also includes subtracting the action command value of the activated one or more action command from the time point in the case where the one or more action command or the special action command is activated.

Moreover, still another aspect of the present invention is directed to a computer program product for processing a video game. In this case, progress of the video game is controlled by causing an image display apparatus to display a player character on an image display screen of the image display apparatus, and controlling an action of each character to be displayed on the image display screen in accordance with operations by a player. The computer program product of the present invention causes a computer to execute steps including adding a predetermined time point to an accumulated value of the time point in accordance with lapse of time.

The steps also include causing the image display apparatus to display the accumulated value of the time point and an accumulated maximum value of the time point on the image display screen.

The steps also include receiving specification of a special effect on condition that the accumulated maximum value of the time point is caused to be lowered, the special effect being applied to the player character.

The steps also include storing the received special effect and a special effect applied value so that the received special effect corresponds to the special effect applied value, the special effect applied value being set to the special effect.

The steps also include subtracting the special effect applied value set to the received special effect from the accumulated maximum value of the time point when the specification of the special effect is received.

The steps also include applying the special effect to the player character in the case where the specification of the special effect is received.

The steps also include sequentially receiving specification of a plurality of action commands for specifying an action of the player character.

The steps also include storing the received action command, an action command value set to the action command and a received order of the action command so as to correspond to each other.

The steps also include monitoring the accumulated value of the time point, and activating the action command whose received order is the earliest among the received action commands in the case where the accumulated value of the time point is the action command value of the action command or more.

The steps also include subtracting the action command value of the activated action command from the time point in the case where the action command is activated.

In another embodiment of the present invention, the computer program product of the present invention causes a computer to execute steps including adding a predetermined time point to an accumulated value of the time point in accordance with lapse of time.

The steps also include causing the image display apparatus to display the accumulated value of the time point and an accumulated maximum value of the time point on the image display screen.

The steps also include receiving specification of a special effect on condition that the accumulated maximum value of the time point is caused to be lowered, the special effect being applied to the player character.

The steps also include storing the received special effect and a special effect applied value so that the received special effect corresponds to the special effect applied value, the special effect applied value being set to the special effect.

The steps also include subtracting the special effect applied value set to the received special effect from the accumulated maximum value of the time point when the specification of the special effect is received.

The steps also include applying the special effect to the player character in the case where the specification of the special effect is received.

The steps also include sequentially receiving specification of a plurality of action commands for specifying an action of the player character.

The steps also include storing the received action command, an action command value set to the action command and a received order of the action command so as to correspond to each other.

The steps also include monitoring the accumulated value of the time point, and sequentially activating the action commands in accordance with received order of the action commands in the case where the accumulated value of the time point is the accumulated value of the action command values of the received action commands or more.

The steps also include subtracting the action command value of the activated action command from the time point in the case where the action command is activated.

In still another embodiment of the present invention, the computer program product of the present invention causes a computer to execute steps including adding a predetermined time point to an accumulated value of the time point in accordance with lapse of time.

The steps also include causing the image display apparatus to display the accumulated value of the time point and an accumulated maximum value of the time point on the image display screen.

The steps also include receiving specification of a special effect on condition that the accumulated maximum value of the time point is caused to be lowered, the special effect being applied to the player character.

The steps also include storing the received special effect and a special effect applied value so that the received special effect corresponds to the special effect applied value, the special effect applied value being set to the special effect.

The steps also include subtracting the special effect applied value set to the received special effect from the accumulated maximum value of the time point when the specification of the special effect is received.

The steps also include applying the special effect to the player character in the case where the specification of the special effect is received.

The steps also include sequentially receiving specification of a plurality of action commands for specifying an action of the player character.

The steps also include storing the received action command and an action command value set to the action command so as to correspond to each other.

The steps also include receiving an instruction to reserve activation of action commands on the basis of operations of the player.

The steps also include setting reservation to activate one or more action command that has not been reserved to activate yet among the stored action commands when the instruction to reserve activation of the action commands is received.

The steps also include monitoring the accumulated value of the time point, and activating the one or more action command or a special action command of the one or more action command in the case where the accumulated value of the time point is the accumulated value of the action command value of the one or more action command whose activation reserving order is the earliest among the action commands that have already reserved to activate or more, the special action command being determined in accordance with combination of the one or more action command.

The steps also include subtracting the action command value of the activated one or more action command from the time point in the case where the one or more action command or the special action command is activated.

According to the present invention, points (time) required to activate a command can be changed in accordance with the degree of difficulty and/or destructive power (or recovery power) of the command to be activated, and a plurality of commands can be specified at once within the accumulated points. Thus, it is possible to improve realism (realistic sensation) in a battle scene of a RPG game (video game), and this makes it possible to improve interest in the RPG game of a player.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Preferred embodiments of a video game processing apparatus, a method and a computer program product for processing a video game according to the present invention will now be described in detail with reference to the appending drawings.

Figure 1:
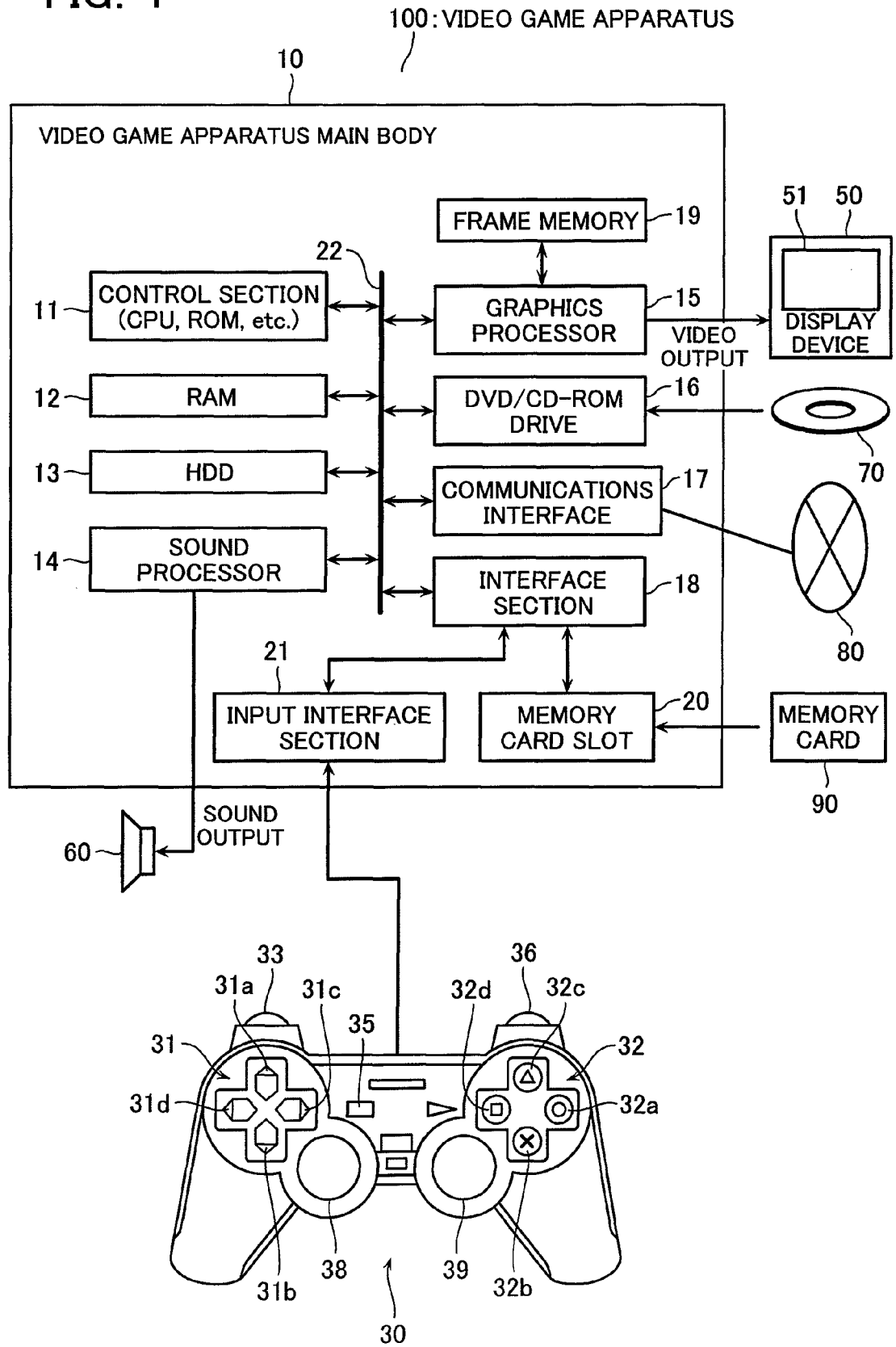
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the present invention. As shown in FIG. 1, a video game apparatus 100 of the present embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micro-mirror device, a holographic display device, or any combination thereof. The display device 50 is provided with an image display screen 51. However, those skilled in the art will readily recognize that any device capable of generating or reproducing an image may be used without departing from the scope or spirit of the present invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

Each of the control section 11, the RAM (Random Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like. The control section 11 executes control processes of the whole video game apparatus 100 in accordance with control programs stored in the HDD 13 and/or a storage medium 70. The control section 11 includes an internal timer used to generate a timer interruption. The RAM 12 is used as a work area for the control section 11. The HDD 13 is a storage area for storing the control programs and various data.

The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that executes a process according to the control programs. In this regard, the sound output device 60 may be embedded in the display device 50 or the video game apparatus main body 10, or may be affixed to a vibrating surface that may be caused to generate the audible signal.

The graphics processor 15 is connected to the display device 50 including the image display screen 51 on which an image is displayed. However, those skilled in the art will readily recognize that the graphics processor may be coupled to other known types of display devices, such as a head-mounted display, a holographic three-dimensional display or the like, without departing from the spirit or scope of the present invention. The graphics processor 15 develops an image on the frame memory 19 in accordance with a drawing or graphics command from the control section 11, and outputs video signals for displaying the image on the image display screen 51 to the display device 50. A switching time for images to be displayed according to the video signals is set to 1/30 seconds per frame (for NTSC type displays), for example. However, the switching time may be any other frame rate (for example, 1/25 second per frame (for PAL type displays)) as those skilled in the art will appreciate without departing from the spirit or scope of the present invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 executes a process for reading out various data such as control programs from the storage medium 70.

The communications interface 17 is connected to a communication network 80 such as the Internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input interface section 21 and the memory card slot 20 is connected to the interface section 18. The interface section 18 causes instruction data from the input interface section 21 to be stored in the RAM 12 on the basis of operation(s) of a controller device such as a keypad 30 by a player of the video game apparatus 100. In response to the instruction data stored in the RAM 12, the control section 11 executes various arithmetic processing.

The video game apparatus main body 10 is connected to the controller device such as the keypad 30 as an operation input section (controller) via the input interface section 21. However, other types of controllers may be used without departing from the scope or spirit of the present invention.

As shown in FIG. 1, for example, a cross key 31, a group of buttons 32, a left joystick 38 and a right joystick 39 are arranged on the upper surface of the keypad 30. The cross key 31 includes an upper key 31a, a lower key 31b, a right key 31c and a left key 31d. The group of buttons 32 includes a circle button 32a, an X button 32b, a triangle button 32c and a square button 32d. Further, a select button 35 is arranged at a connecting portion between a base on which the cross key 31 is arranged and a base on which the group of buttons 32 are arranged. In addition, multiple buttons such as an R1 button 36 and an L1 button 33 are arranged at the side surface of the keypad 30.

The keypad 30 is provided with multiple switches respectively connected to the cross key 31, the circle button 32a, the X button 32b, the triangle button 32c, the square button 32d, the select button 35, the R1 button 36 and the L1 button 33. When pressing force is applied to any button, the corresponding switch is turned on. A detected signal in accordance with on/off of the switch is generated in the keypad 30, and detected signals are generated, respectively, corresponding to inclined directions of the left joystick 38 and the right joystick 39 in the keypad 30.

The two types of detected signals generated in the keypad 30 are outputted to the control section 11 via the input interface section 21 (through wired or wireless connection), by which detected information indicating that any button on the keypad 30 is pressed and detected information indicating the state of each of the left joystick 38 and the right joystick 39 are generated. In this way, operation instruction(s) by a user (player) using the keypad 30, for example, is supplied to the video game apparatus main body 10 (that is, the control section 11).

Further, the interface section 18 executes, according to the command(s) from the control section 11, a process to store data indicative of the progress of the video game stored in the RAM 12 into the memory card 90 installed in the memory card slot 20. The interface section 18 also executes processes to read out data on the video game stored in the memory card 90 at the time of suspending the video game and to transfer such data to the RAM 12, and the like.

Various data, such as control program data for performing the video game with the video game apparatus 100, are stored in the storage medium 70, for example. The various data, such as the control program data stored in the storage medium 70, are read out by the DVD/CD-ROM drive 16 in which the storage medium 70 is installed. The data thus read out are loaded onto the RAM 12. The control section 11 executes, in accordance with the control program loaded on the RAM 12, various processes such as a process to output the drawing or graphics command to the graphics processor 15, and a process to output the sound outputting command to the sound processor 14. In this regard, the interim data generated in response to the progress of the video game (for example, data indicative of scoring of the video game, the state of a player character and the like) are stored in the RAM 12 used as a work memory while the control section 11 executes processing.

It is assumed that a three-dimensional video game according to an aspect of the present embodiment is a video game wherein multiple characters, including a player character (that is, a character that moves in accordance with the operation of the keypad 30 by the player), move on a field provided in a virtual three-dimensional space, by which the video game proceeds. In this regard, it is assumed that the virtual three-dimensional space in which the field is formed is indicated by coordinates of the world coordinate system. The field is defined by multiple surfaces, and coordinates of vertexes of the respective constituent surfaces are shown as characteristic points.

Next, an operation of the video game apparatus 100 according to an aspect of the present embodiment will now be described.

Here, in order to simplify the explanation of the operation of the video game apparatus 100, it is assumed that only a single player character and multiple non-player characters (which are moved in accordance with control processes of the video game apparatus 100 (more specifically, control processes of the control section 11), and hereinafter, referred to simply as "NPC") exist as objects that are movable in the virtual three-dimensional space. However, the explanations for any process other than the processes relating to the present invention are omitted, in particular. In this regard, in the present embodiment, video game control for a RPG is executed, but those skilled in the art will recognize and appreciate that changes to the present invention can be made without departing from the scope or spirit of the present invention.

Figure 2:
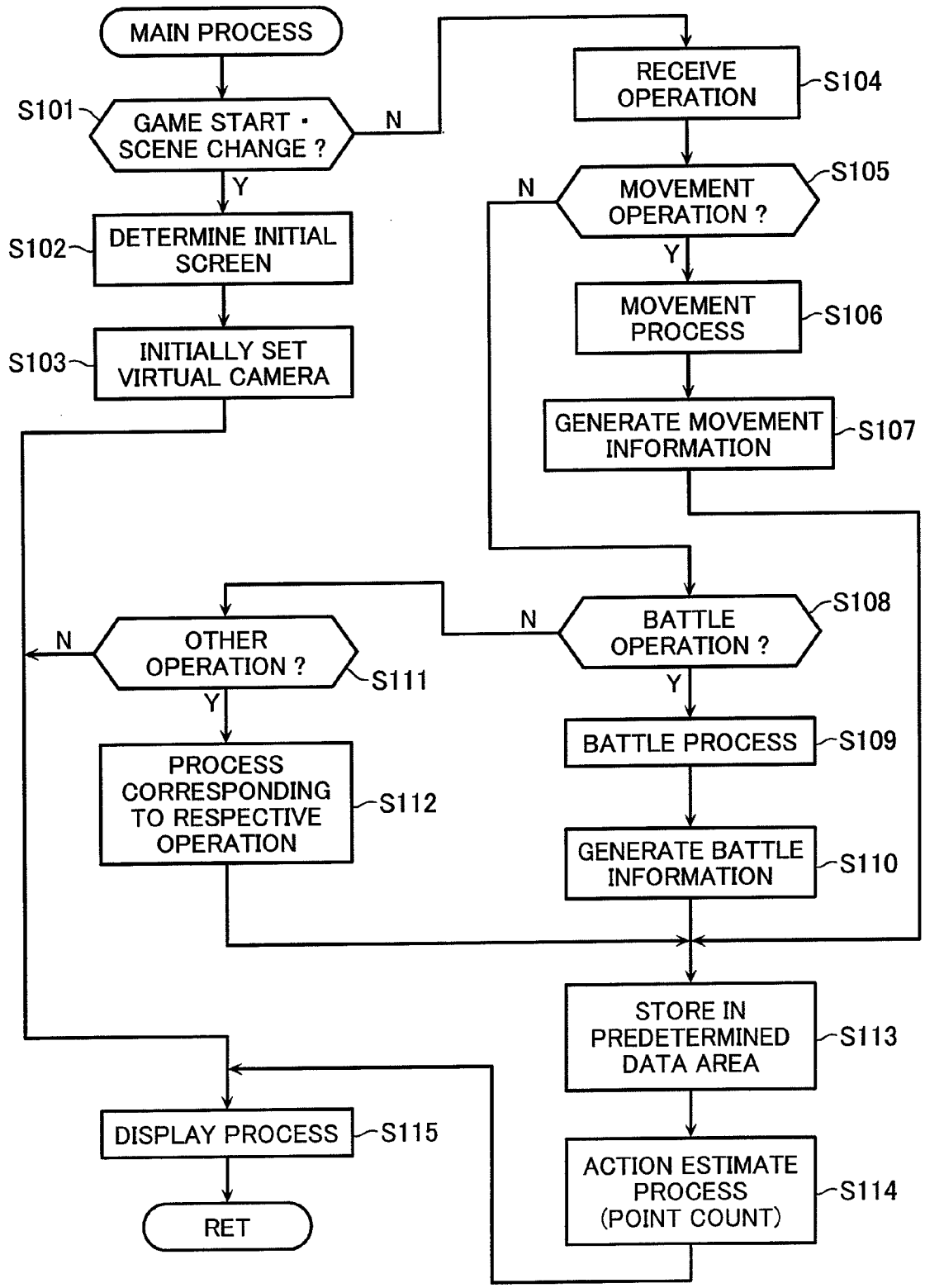
FIG. 2 is a flowchart that illustrates an example of a main process.

FIG. 2 is a flowchart that illustrates an example of a main process of the video game apparatus 100 according to the present embodiment. The main process is a process for generating an image for one frame and a process required for the control of the video game. The process is executed in accordance with a timer interruption at every 1/30 second. However, it is to be noted that timing of "at every 1/30 second" is only one example, as mentioned above. Instead, for example, the main process may be executed in accordance with a timer interruption at every single field period (every 1/60 second) or at every two frame periods (every 1/15 second), or any other appropriate field rate that may be recognized by those skilled in the art to be appropriate without departing from the scope or spirit of the present invention.

In the present embodiment, a video game (that is, a RPG game) proceeds in a common field (that is, a single field where a battle field and a movement field are not distinguished from each other) in which various actions (such as a battle action and/or a movement action), including the movement of the player character and a battle by the player character, are allowed. In the case where a predetermined object in the field is accomplished, one stage may be terminated and the processing may proceed to another stage executed in a next field. Further, in the present embodiment, a same time base is applied to the respective characters existing in such a field. Once a NPC enters the stage in the field, the NPC moves on the field or stands still on the field in accordance with the same time base until a hit point (which is a value indicating life force, and hereinafter, referred to simply as "HP") thereof becomes zero. In this case, a portion displayed on the image display screen 51 as a character image is a portion that exists within the field of view of a virtual camera in the field.

In the main process, the control section 11 determines whether an instruction to start a video game is generated through an operation of the keypad 30, via manipulation of the controller 30 by the player or not in the case where the state is still before the video game start. Alternatively, once the video game has started or is in progress, the control section 11 determines whether a timing state is reached to change the scene (for example, change the field) or not in the case where the state is during execution of the video game (Step S101). The timing state to change the scene is, for example, the time at which a virtual three-dimensional space illustrating a new scene is displayed on the image display screen 51 in order to finish the scene that has been displayed on the image display screen 51 until that point (for example, a scene displayed by means of a virtual three-dimensional space, and a scene displayed by means of a directorial moving image) and to switch the displayed scene to the new scene.

In the case where it is determined that an instruction to start a video game is generated or that the timing state reaches a state to change the scene ("Yes" at Step S101), the control section 11 determines an initial screen (an initial screen shown at the time of a start of the video game, or an initial screen shown at the time of a change in the scene) in accordance with the control program (Step S102). In this case, various data, such as image data used for the video game and characters, are stored in the storage medium 70. At Step S102, an initial display position of the player character in an initial screen or a scene after a scene change (for example, a new stage in the RPG), a non-player character or non-player characters to be displayed, an initial display position of each of the non-player characters (NPCs) to be displayed and the like are determined in accordance with the control program.

Subsequently, the control section 11 determines a viewpoint position of a virtual camera, a direction of a visual axis, and a size of a visual angle in accordance with the control program. The control section 11 then executes an initial setup for the virtual camera to execute a perspective transformation (Step S103). Then, the processing flow proceeds to Step S115.

On the other hand, in the case where it is determined that the video game is executed, and it is not time to change the scene ("No" at Step S101), the control section 11 receives instruction data in accordance with the operation of the keypad 30 by the player (Step S104). Namely, the control section 11 determines whether or not instruction data for executing movement of the player character or the like are inputted from the keypad 30 via the input interface section 21. In the case where effective instruction data (that is, it means that such effective instruction data are instruction data that is allowed to be received by the control section 11) are inputted, the control section 11 receives the effective instruction data.

In the case where the control section 11 receives instruction data for instructing an action of the player character relating to the movement of the player character (that is, movement instruction data: a movement instruction by a movement command or the cross key (directional instruction key)) in accordance with the operation of the keypad 30 relating to the movement of the player character (movement operation) at Step S104 ("Yes" at Step S105), the control section 11 executes a movement process in accordance with the movement instruction data thus received (Step S106). In the movement process, the control section 11 causes the position of the player character to be moved in a virtual space (on the present field) in accordance with the received movement instruction data. In this regard, such a movement command may include a dash instruction command, for example. The dash instruction command is a command to move the player character quickly, and a command for supplying an instruction that the player character goes away (or runs away) from a battle area quickly if the player character is in a melee, for example.

Subsequently, the control section 11 generates movement information on the basis of the position information of the player character derived along with the movement process (Step S107). Namely, in accordance with the movement of the position of the player character by means of the movement process, the control section 11 updates necessary data among data on the viewpoint position of the virtual camera, data on the direction of a visual axis, data on the size of a visual angle, and the like. The control section 11 then changes the setting content of the virtual camera. The movement information includes various kinds of information on the movement such as the position of the player character after the movement, the viewpoint position of the virtual camera, the direction of the visual axis, and the size of the visual angle changed along with the movement of the player character as well as the information on the movement of the player character. Then, the processing flow proceeds to Step S113.

In the case where the control section 11 receives instruction data for instructing an action for the player character relating to a battle (that is, battle instruction data: a battle command) in accordance with the operation of the keypad 30 by the player for instructing the action of the player character relating to a battle (a battle operation) at Step S104 ("Yes" at Step S108), the control section 11 executes a battle process in accordance with the received battle instruction data (Step S109). In the battle process, the control section 11 executes, for example, a process to determine a battle result and/or battle development between an enemy character (that is, a non-player character to battle against) and the player character, and the like.

Subsequently, the control section 11 generates battle information on the basis of the battle result and/or battle development determined by means of the battle process (Step S110). Namely, in accordance with the battle result and/or battle development by the battle process, the control section 11 updates and sets necessary information. The set information may include, for example, the name of the player character that battles an enemy character in the battle process, the name of the enemy character, battle development information, battle result information, a parameter (or parameters) that defines the ability (or abilities) of the player character, and the like. The battle information includes various kinds of information on the battle, such as the name of the player character that battles the enemy character, the name of the enemy character, battle development, battle result thereof, and a parameter that defines the ability of the player character. Then, the processing flow proceeds to Step S113.

In the case where the control section 11 receives instruction data for other instructions (that is, other instruction data: another command) in accordance with the operation of the keypad 30 for executing other instruction (other operation) at Step S104 ("No" at Step S105, "No" at Step S108, and "Yes" at Step S111), the control section 11 executes a process (for example, a conversation between characters, a purchase action, a pick up action, and the like) in accordance with the other instruction data thus received (Step S112). The other information corresponding to the process result at Step S112 is then generated, and the processing flow proceeds to Step S113.

The control section 11 updates the current position of the player character by storing the movement information generated at Step S107 in a predetermined data area of the RAM 12 at Step S113. Further, the control section 11 memorizes and stores various action histories of the player character by storing the battle information generated at Step S110 and the other information generated after Step S112 in a predetermined data area of the RAM 12 at Step S113.

Subsequently, the control section 11 executes an action estimate process on the basis of the information indicating the action histories of the player character once stored in the RAM 12 (Step S114). More specifically, information required to be digitized is digitized using conversion tables prepared in advance. Further, with respect to information required to be weighted, a score is calculated by multiplying predetermined numerical values and summing these multiplied numerical values. The calculated score is added to a previous score stored in a predetermined data area of the RAM 12, and the added score is again stored in the predetermined data area. In this way, the score is updated as estimate information.

Then, the control section 11 perspectively transforms the virtual three-dimensional space including the player character and the non-player characters to be displayed from the virtual camera onto the virtual screen in accordance with the setting contents of the virtual camera and the like. The control section 11 then executes a display process to generate a two-dimensional image to be displayed on the image display screen 51 (Step S115). When the display process is terminated, this main process is also terminated. Then, when a timer interruption is generated at the time of a start of a next frame period, a next main process is executed (that is, the main process is repeated). By repeatedly executing the main process, a character image is switched or shifted every frame period, and a moving image (animation) is resultantly displayed on the image display screen 51.

Now, the display process at Step S115 will be briefly described. At Step S115, the control section 11 first transforms at least the coordinates of the vertexes of respective polygons included within a range to be perspectively transformed on the virtual screen among the coordinates of the vertexes of polygons constituting the virtual three-dimensional space, in which the player character and the three-dimensional non-player characters are included, from the coordinates of the world coordinate system to the coordinates of the viewpoint coordinate system. Subsequently, the control section 11 transmits the coordinates of the vertexes of the polygons of the player character and the non-player characters in the viewpoint coordinate system to the graphics processor 15, thereby outputting a drawing or graphics command to the graphics processor 15.

When the drawing or graphics command is inputted to the graphics processor 15, the graphics processor 15 updates, on the basis of the coordinates of the viewpoint coordinate system, the content of the Z buffer so that data on the points that reside at the front side are retained with respect to each of points constituting respective surfaces. When the content of the Z buffer is updated, the graphics processor 15 develops image data on the points that reside at the front side on the frame memory 19. Moreover, the graphics processor 15 executes some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals outputted from the graphics processor 15 on the image display screen 51. By switching images displayed on the image display screen 51 every single frame period, the player can see images including the state in which the player character and/or the non-player characters are moved on the field and perceive the images as moving images.

Next, an example of a three-dimensional field screen displayed on the image display screen 51 of the display device 50 will now be described that shows a battle state between a player character and an enemy character.

Figure 3:
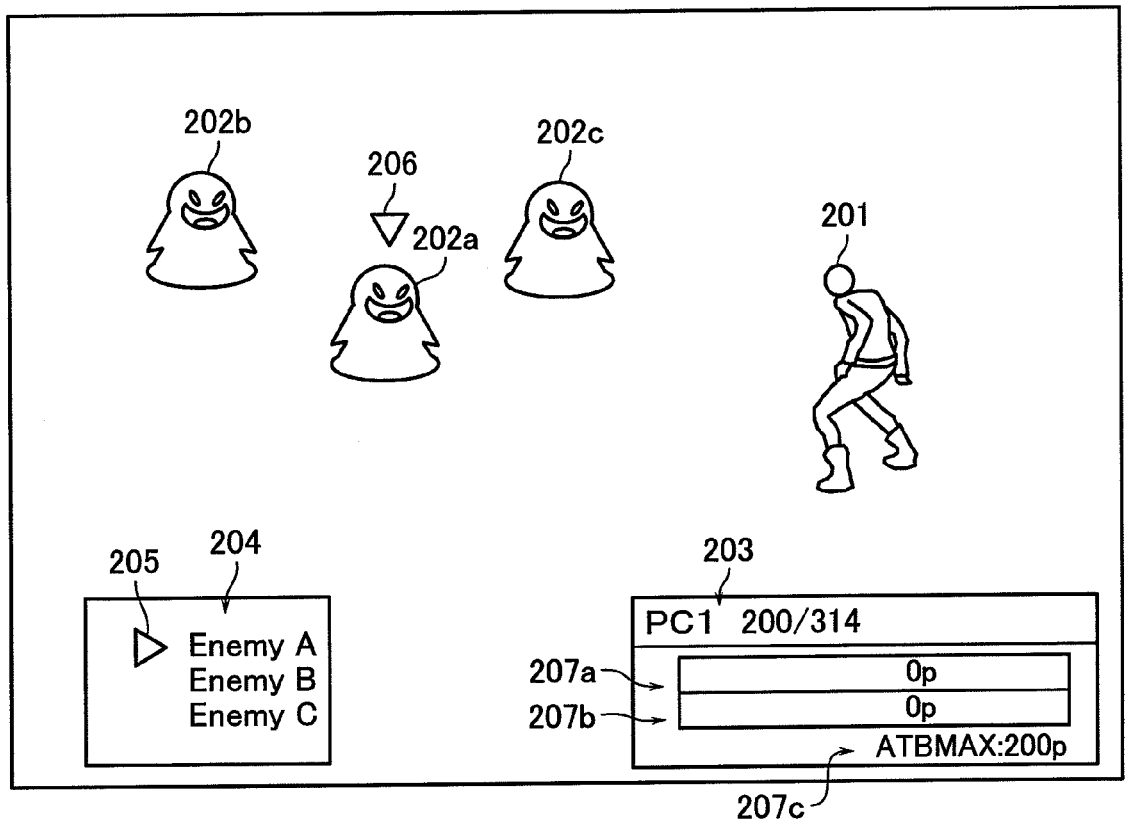
FIG. 3 is an explanatory drawing that shows an example of a three-dimensional field screen in a battle start state.

FIG. 3 is an explanatory drawing that shows an example of the three-dimensional field screen in a battle start state. As shown in FIG. 3, respective characters such as a player character 201, and enemy characters 202a to 202c that thwart accomplishment of a predetermined object in the video game are displayed in the three-dimensional field screen, for example. Further, in addition to the respective characters, an HP display region 203, an enemy character name display region 204, a selection cursor 205, a target cursor 206, an ATB gauge 207a, a command issuance reserving point gauge 207b, and a maximum accumulated ATB display region 207c are provided in the three-dimensional field screen. A character name and the maximum value and a current value of a hit point (HP) for the player character 201 are displayed in the HP display region 203. A character name of each of the enemy characters 202a to 202c is displayed in the enemy character name display region 204. The selection cursor 205 is moved on the basis of an instruction signal using the keypad 30 from the player. A target that is a subject of an action of the player character 201 is specified by the target cursor 206. An accumulated value of an ATB (Active Time Battle) value is displayed in the ATB gauge 207a. An accumulated value of a command issuance reserving point is displayed in the command issuance reserving point gauge 207b. In this case, the command issuance reserving point is a point of the ATB value that is set to an action command reserved to be issued, and that is to be consumed at the issuance of the action command. A maximum accumulated ATB value is displayed in the maximum accumulated ATB display region 207c. In this regard, in the present embodiment, the accumulated maximum value of the ATB gauge 207a and the accumulated maximum value of the command issuance reserving point gauge 207b are set to be equal to each other. For example, as shown in the maximum accumulated ATB display region 207c in FIG. 3, the maximum accumulated ATB value becomes "200 points".

Here, the "ATB value" means a value to which a predetermined value is added in accordance with lapse of time and from which other predetermined value is subtracted by means of execution of a command of the player character (for example, an action of the player character such as an attack and a defense). More specifically, the player cannot activate a command of the player character 201 unless the player waits until the ATB value is accumulated up to a predetermined value. In other words, the player must deliberately activate a command for the player character 201 changing with lapse of time while referring to an accumulated value of the ATB value displayed in the ATB gauge 207a. For this reason, it is expected that interest in the video game of the player is improved. A command process relating to addition and/or subtraction of such an ATB value will be described later in detail.

Figure 4:
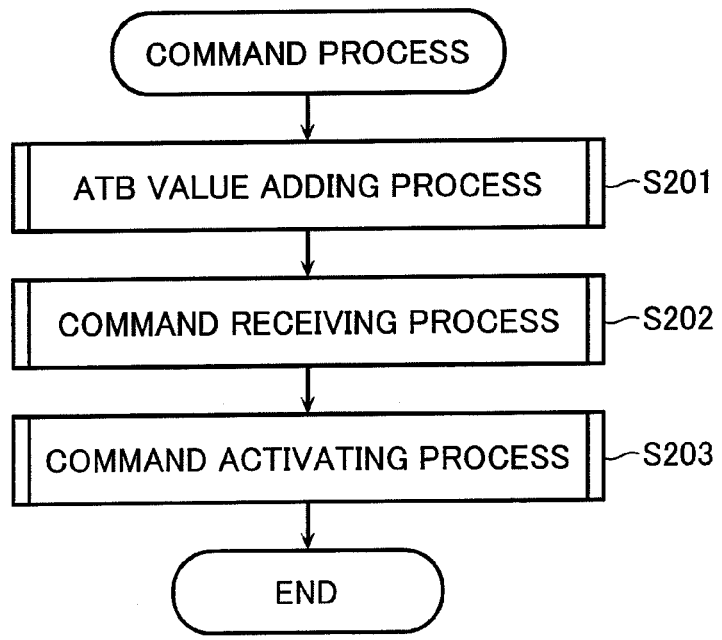
FIG. 4 is a flowchart that illustrates an example of a command process.

A command process to control an action of the player character on the basis of inputs from the player will be described with reference to FIG. 4. FIG. 4 is a flowchart that illustrates an example of a command process executed in the video game apparatus 100 of the present embodiment.

In the command process, the control section 11 first executes an ATB adding process in which an ATB value is added with lapse of time (Step S201). The control section 11 then executes a command receiving process in which command input by means of the keypad 30 is received from the player (Step S202), and further executes a command activating process in which the player character is caused to activate the received command (Step S203).

Figure 5:
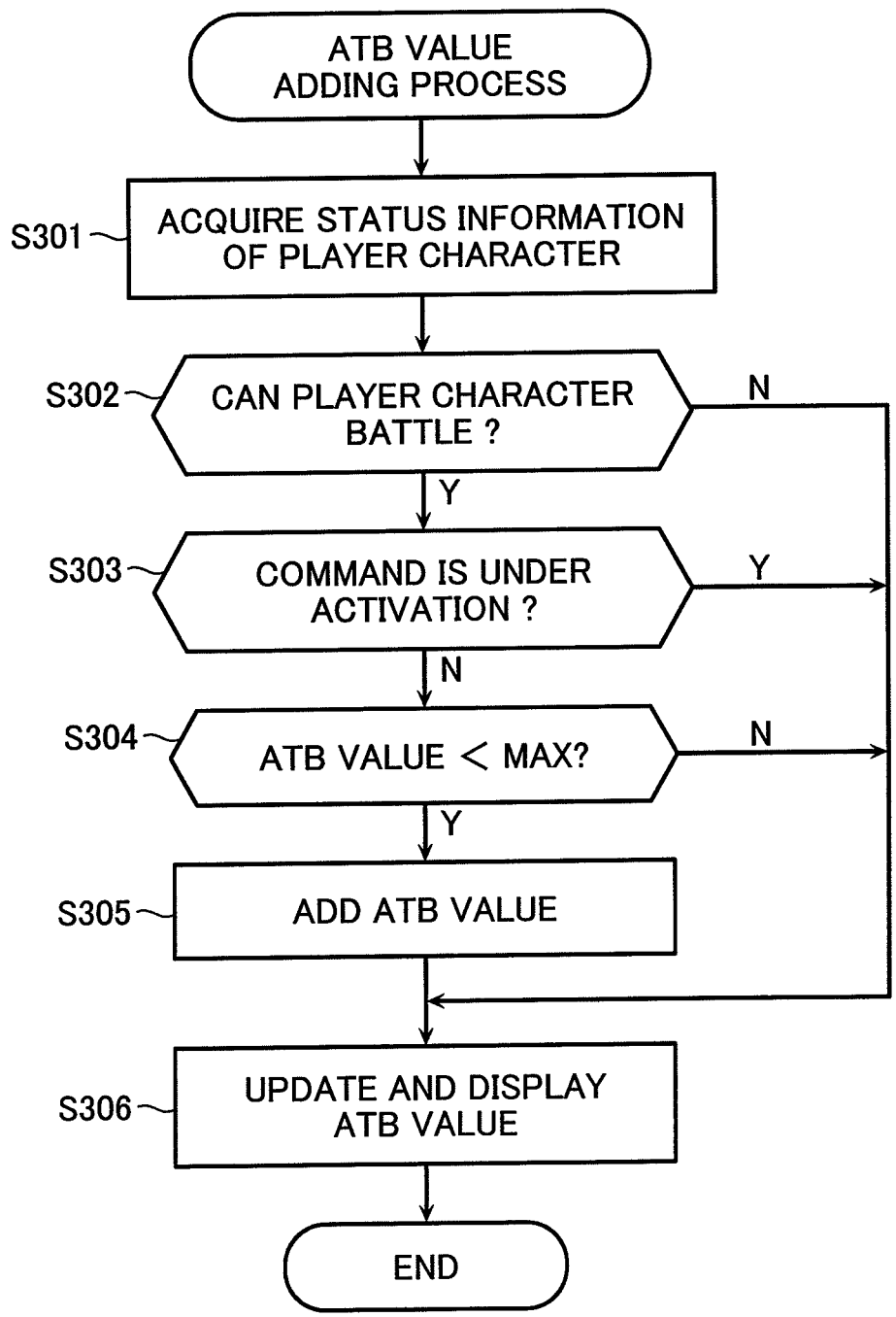
FIG. 5 is a flowchart that illustrates details of an ATB adding process.

Next, the ATB adding process described above (Step S201) will be described in detail with reference to FIG. 5. FIG. 5 is a flowchart that illustrates details of the ATB adding process.

In the ATB adding process, the control section 11 first acquires status information of the player character (Step S301). Here, the "status information of the player character" is information indicating a status of the player character in the video game. The status information of the player character includes a health condition of the player character (a normal condition, a slow condition (that is, a state where an action of the player character is caused to be slow by means of an attack from an enemy character), a battle impossible condition and the like), a level (or growth) of the player character, items that the player character possesses, equipment of the player character, and a command state of the player character (during receipt of a command, during activation of a command, an ATB value, a command issuance reserving point and the like), for example.

Subsequently, the control section 11 determines, on the basis of the status information of the player character acquired at Step S301, whether the player character is in a battle possible state or not (Step S302). In the case where it is determined that the player character is in the battle possible state ("Yes" at Step S302), the control section 11 determines, on the basis of the status information of the player character, whether the player character activates any command or not (Step S303). Subsequently, in the case where it is determined that the player character is not activating any command ("No" at Step S303), the control section 11 determines whether the accumulated ATB value is less than the accumulated maximum value or not (Step S304). Here, in the case where it is determined that the accumulated ATB value is less than the accumulated maximum value ("Yes" at Step S304), the control section 11 adds a predetermined ATB value to the accumulated ATB value (Step S305), and updates a display state of the ATB gauge 207a to be displayed on the image display screen 51 of the display device 50 (Step S306). In this case, the control section 11 determines the predetermined ATB value on the basis of the status information of the player character. For example, in the case where the player character is in the "slow condition", the predetermined ATB value is set to a value lower than that in the "normal condition".

On the other hand, at Step S302, in the case where it is determined that the player character is not in a battle possible state ("No" at Step S302), the control section 11 causes the ATB value adding process to be terminated without adding a predetermined ATB value to the accumulated ATB value. Similarly, at Step S303, in the case where it is determined that the player character activates any command ("Yes" at Step S303), the control section 11 causes the ATB value adding process to be terminated without adding a predetermined ATB value to the accumulated ATB value. Further, at Step S304, in the case where it is determined that the ATB value is the accumulated maximum value ("No" at Step S304), the control section 11 causes the ATB value adding process to be terminated without adding a predetermined ATB value to the accumulated ATB value. Moreover, at Step S302, in the case where it is determined that the player character is not in a battle possible state ("No" at Step S302), the control section 11 may reset the ATB value (that is, set the ATB value to zero) to update the ATB value, and the ATB value adding process may be then terminated.

An added amount of the ATB value (that is, the predetermined ATB value) may specifically be set to 0.2 seconds per one point. Further, the added amount and the maximum value of the ATB gauge 207a may become larger in accordance with the level of the player character. More specifically, the maximum ATB value of the player character when the video game starts may be set to 40 points, while the maximum ATB value of the player character at an end game may be set to 200 points. Further, the control section 11 may increase the added amount and the maximum value of the ATB gauge 207a with the accumulated period of time when the video game is executed.

Figure 6:
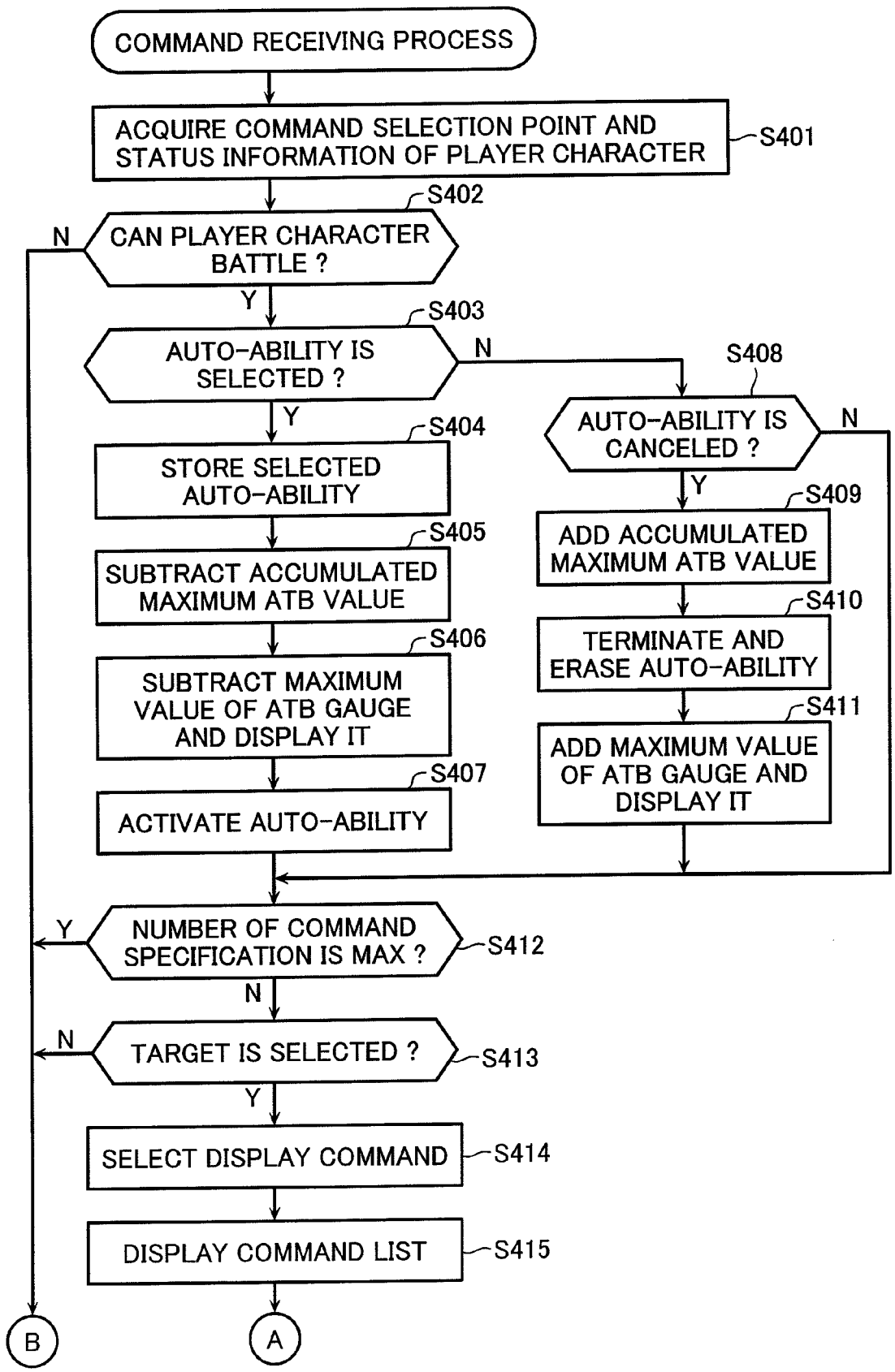
FIG. 6 is a flowchart that illustrates details of a command receiving process.
Figures 7, 8:
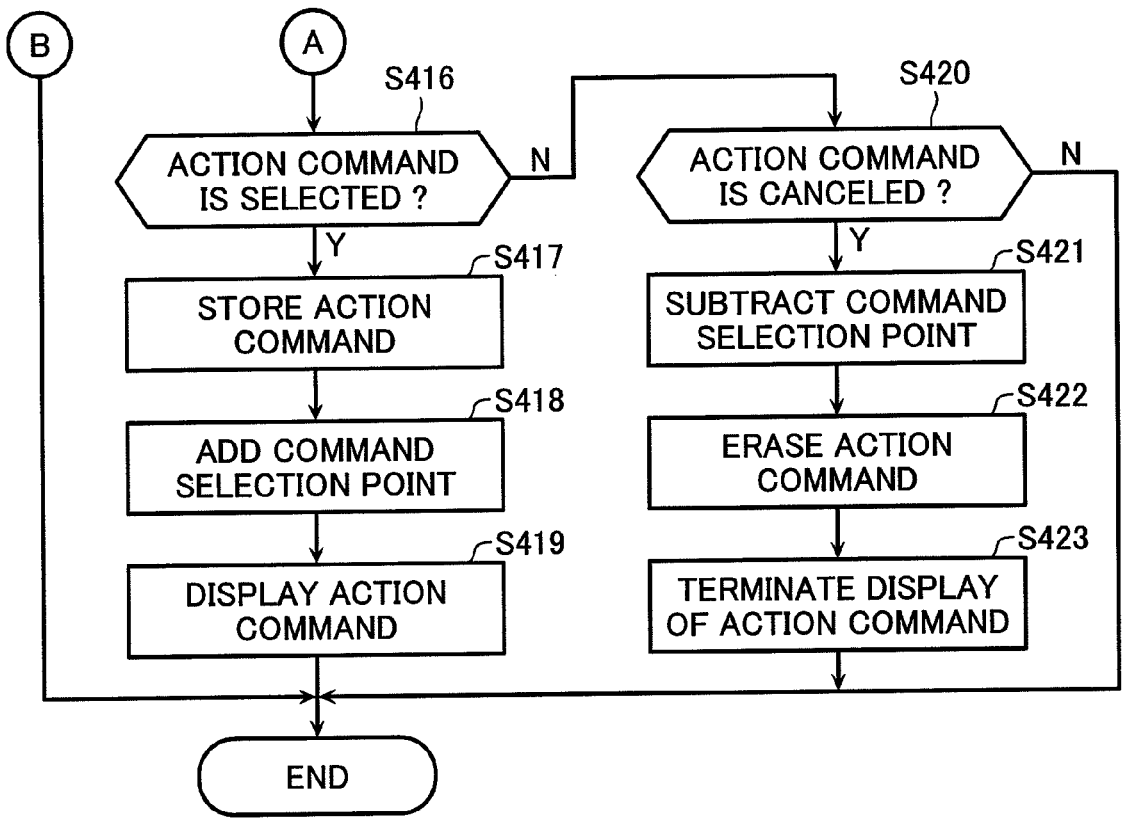
FIG. 7 is a flowchart that illustrates a command receiving process.
FIG. 8 is an explanatory drawing that shows an auto-ability table.

Next, the command receiving process described above (Step S202) will be described in detail with reference to FIGS. 6 and 7. FIGS. 6 and 7 are a flowchart that illustrates the command receiving process.

In the command receiving process, the control section 11 first acquires a command issuance reserving point and status information of the player character (Step S401). Here, a command value (an ATB value required to activate an action command) is set in each of selected action commands. The "command issuance reserving point" means the command value set in the selected action command. Further, information relating to an upper limit number of action commands that the player character can select is included in the status information of the player character. The upper limit number of selectable action commands may be fixed number. Alternatively, the upper limit number of selectable action commands may be increased in accordance with a level of the player character and/or the accumulated time when the video game has been executed.

Subsequently, the control section 11 determines, on the basis of the acquired status information of the player character, whether the player character is in a battle possible state or not (Step S402). In the case where it is determined that the player character is in the battle possible state ("Yes" at Step S402), the control section 11 receives selection of an auto-ability command (that is, the control section 11 determines whether any auto-ability is selected or not) (Step S403).

Here, the "auto-ability" means a special effect (such as offensive power up and defensive power up) that is applied to the player character on condition that the maximum accumulated value of the ATB value is caused to be lowered.

The control section 11 causes the display device 50 to display a display region, by which the player can select any kind of auto-ability, with reference to an auto-ability table as shown in FIG. 8, for example. FIG. 8 is an explanatory drawing that shows the auto-ability table. As shown in FIG. 8, an auto-ability name 301, an effect by selection of corresponding auto-ability 302, and a value to be subtracted from the current accumulated maximum ATB value by selection of the corresponding auto-ability 303 are stored in the auto-ability table 300.

In the case where it is determined that any auto-ability is selected ("Yes" at S403), the control section 11 updates the status information of the player character to store the selected auto-ability (Step S404). The control section 11 then subtracts a predetermined ATB value from the accumulated maximum ATB value (that is, ATBMAX as shown in FIG. 3) (Step S405), whereby the control section 11 causes the display device 50 to display the accumulated maximum ATB value thus subtracted, the ABT gauge 207a and the command issuance reserving point gauge 207b whose accumulated maximum value is subtracted on the basis of the subtraction of the accumulated maximum ATB value (Step S406), and activates the selected auto-ability (Step S407).

For example, as shown in FIG. 8, when an "auto-ability 1" is selected, the control section 11 updates offensive power of the player character in the status information to twice as much. For example, the control section 11 subtracts "40 points" from "200 points", which is the accumulated maximum ATB value before selection of the "auto-ability 1", and set the subtracted value "160 points" as the accumulated maximum ATB value after the selection.

Figures 9, 10:
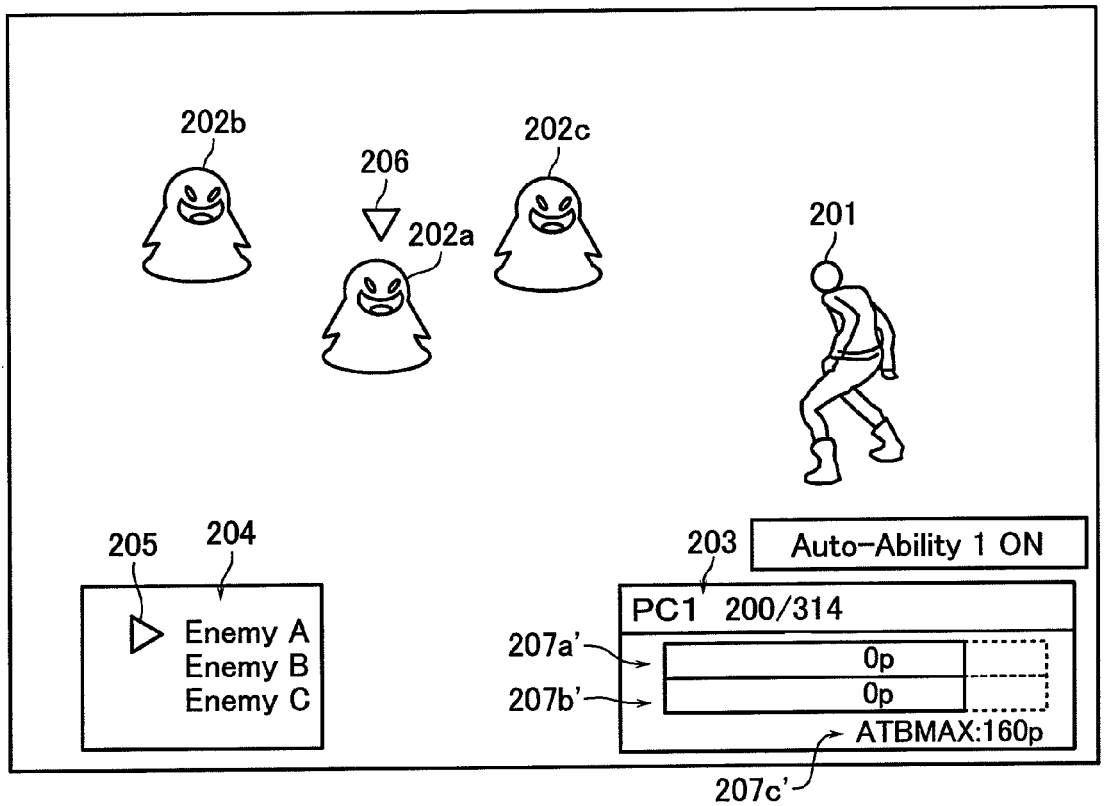
FIG. 9 is an explanatory drawing that shows a three-dimensional field screen in a state where auto-ability is executed at a state shown in FIG. 3.
FIG. 10 is an explanatory drawing that shows a command table.

When the "auto-ability 1" is selected at the state shown in FIG. 3, as shown in FIG. 9, the ATB gauge 207a', the command issuance reserving point gauge 207b' and the maximum accumulated ATB display region 207c' that have been updated are displayed on the image display screen 51. Namely, the ATB gauge 207a' and the command issuance reserving point gauge 207b' are displayed so as to become shorter than those shown in FIG. 3, and the "160 points" is displayed in the maximum accumulated ATB display region 207c'. In this regard, the length of each of the gauges 207a and 207b before the selection of the auto-ability is displayed by means of dotted lines. Further, a display region such as "Auto-Ability 1 ON" is provided on the image display screen 51 of the display device 50, for example. The display "Auto-Ability 1 ON" indicates that the "auto-ability 1" is applied to the player character. In addition, the indication that the "auto-ability 1" is applied to the player character is produced by means of not only a display, but also a sound.

On the other hand, in the case where it is determined that any auto-ability is not selected (that is, any auto-ability is not received) ("No" at Step S403), the control section 11 determines whether cancellation of the stored auto-ability is received or not (Step S408). Here, in the case where it is determined that the cancellation of the stored auto-ability is received on the basis of input to the keypad 30 by the player, the control section 11 updates the status information of the player character, and adds the predetermined ATB value to the accumulated maximum ATB value to return the status information to the former state that is the state before the selection of the auto-ability (Step S409). The control section 11 erases the stored auto-ability to terminate the auto-ability (Step S410). Further, the control section 11 increases the accumulated maximum value of the ATB gauge 207a that has been subtracted for the erased auto-ability up to the original value thereof, thereby returning the display of the ATB gauge 207a to that before the selection of the auto-ability (Step S411).

After the steps for selecting the auto-ability or canceling the stored auto-ability as described above (Steps S403 to S411), the control section 11 confirms whether or not the number of selected command specifications is an upper limit value set to the player character (Step S412). In the case where it is confirmed that the number of selected command specifications is not an upper limit value set to the player character ("No" at Step S412), the control section 11 receives selection of a target that is a subject of the action of the player character (Step S413). Namely, the control section 11 determines whether the target is selected or not.

On the other hand, in the case where it is determined that the player character is not in a battle possible state ("No" at Step S402), the control section 11 causes the command receiving process to be terminated. Similarly, in the case where it is determined that the number of selected command specifications is an upper limit value set to the player character ("Yes" at Step S412), the control section 11 causes the command receiving process to be terminated. In this case, the video game apparatus 100 may be constructed so that the control section 11 determines the upper limit value of the number of command specifications on the basis of an accumulated period of time to execute the video game in addition to the status information of the player character.

Here, a concrete example of a process to receive the target selection (Step S413) will be described with reference to FIG. 3. As shown in FIG. 3, the player presses the lower key 31b of the cross key 31 to move the selection cursor 205 downward. A target is thereby selected. The player then determines the target by pressing the circle button 32a. In the example shown in FIG. 3, an enemy character A is selected as a target.

Subsequently, in the case where it is determined that the target is selected ("Yes" at Step S413), the control section 11 selects an action command or action commands to be displayed on the image display screen 51 on the basis of the status information of the player character and the accumulated value of the command issuance reserving point acquired at Step S401 (Step S414). The control section 11 then causes the display device 50 to display a list of the selected action commands (Step S415). Subsequently, the control section 11 receives selection of an action command on the basis of operations of the keypad 30 by the player (Step S416). Namely, the control section 11 determines whether any one action command is selected by the player or not.

Here, for example, the control section 11 refers to a command table 400 shown in FIG. 10 to cause the display device 50 to display the list of the action commands. FIG. 10 is an explanatory drawing that shows the command table 400 constructed from information on the action command when the player character is in the "level 2" state. A command name 401, a command value 402, a category name of the command 403, a command acquired level 404 that is necessary for the player character to acquire the command, and a command acquired flag 405 that indicates whether or not the player character can select the command are provided in the command table 400. Since the player character is in the level 2 at this stage, the command acquired flag 405 of each of the commands whose command acquired levels 404 are set to the level 3 or level 4 is set to "0", while the command acquired flag 405 of each of the commands whose command acquired levels 404 are set to the level 1 or level 2 is set to "1". In the case where it is determined that "1" is set in the command acquired flag 405, the control section 11 causes the display device to display the corresponding command name 401 on the image display screen 51. Further, the control section 11 arranges the command names in descending order of the command value 402 with reference to the command table 400 and causes the display device 50 to display them on the image display screen 51. Alternatively, the control section 11 may arrange the command names in descending order of the command acquired level 404 and causes the display device 50 to display them on the image display screen 51.

Figure 11:
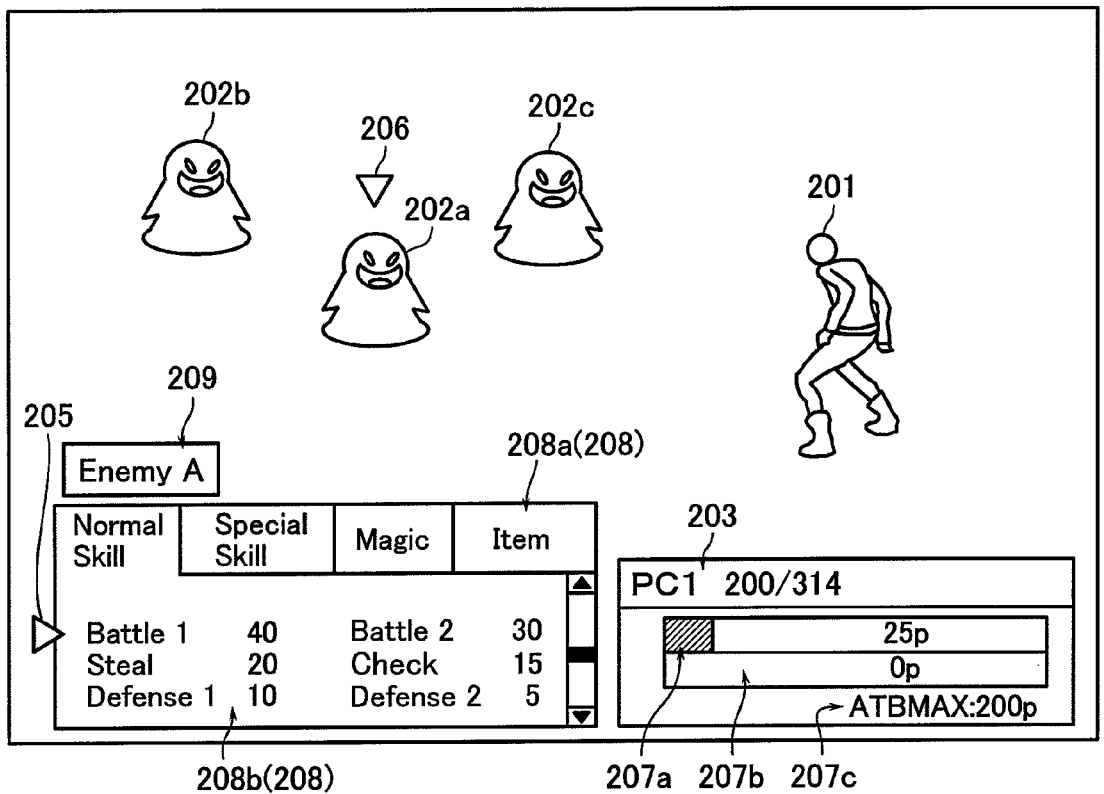
FIG. 11 is an explanatory drawing that shows an example of a three-dimensional field screen in a state where a predetermined period of time elapses after a target is selected at a state shown in FIG. 3.

The control section 11 classifies commands on the basis of the category names 403 with reference to the command table 400, and causes the display device 50 to display a command menu 208 as shown in FIG. 11. Further, the control section 11 refers to the command values 402 in the command table 400, and confirms whether or not a command value 402 of each of the command names 401 is a predetermined subtracted value or less. In this case, the predetermined subtracted value is a value obtained by subtracting an accumulated value of command issuance reserving point of each of the received commands from the accumulated maximum value of the ATB value. In the case where it is confirmed that one command value 402 is the predetermined subtracted value or less, the control section 11 selects the corresponding command name 401. In the case where it is confirmed that any command value 402 is not the predetermined subtracted value or less, the control section 11 does not select the corresponding command name 401. In other words, the control section 11 selects only commands in each of which the accumulated value of the command issuance reserving point thereof becomes the maximum value of the ATB value or less even in the case where one more accumulation is executed.

As described above, in order to prevent the player from mistakenly selecting a command whose command issuance reserving point is an available ATB value or more, a command name 401 of such an unavailable command may be made grayout display in the command menu 208. Alternatively, the command name 401 of such an unavailable (unselectable) command may not be displayed in the first place.

Figure 12:
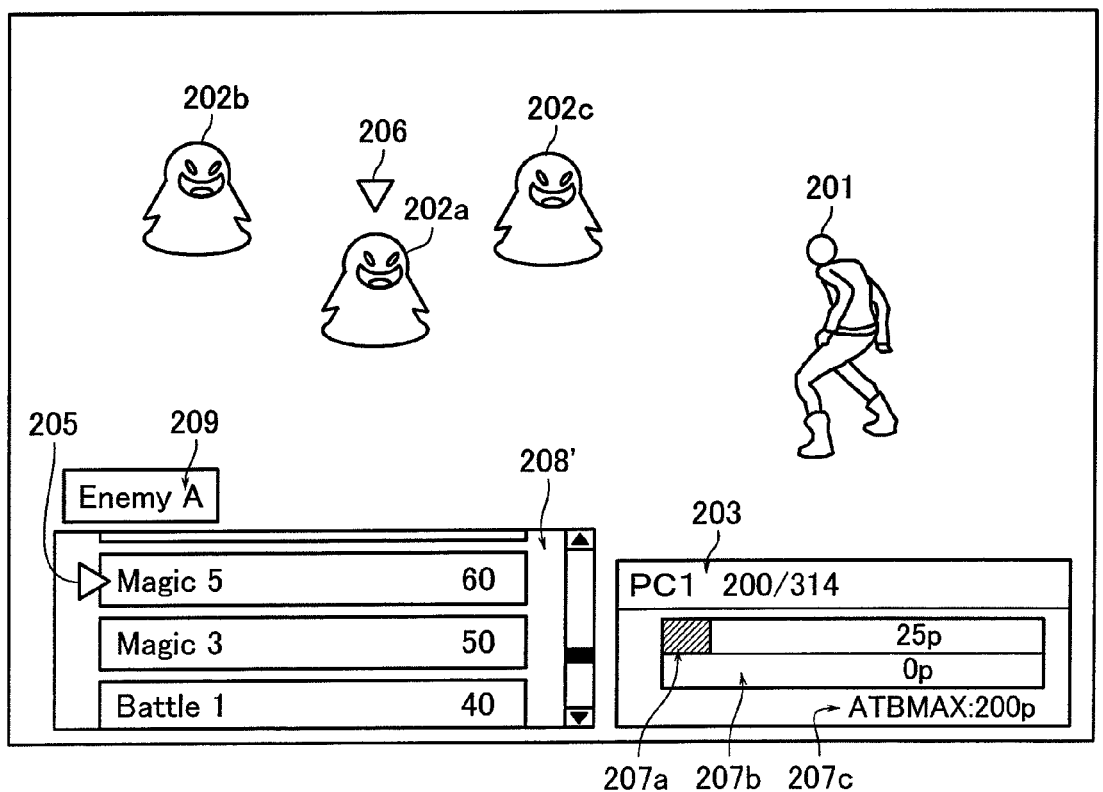
FIG. 12 is an explanatory drawing that shows another example of a three-dimensional field screen in a state where a predetermined period of time elapses after a target is selected at a state shown in FIG. 3.

Moreover, as shown in FIG. 12 (that is, a command menu 208'), all the selectable commands may be arranged in ascending or descending order of the command value (that is, the command issuance reserving point) without managing them on the basis of the category 403, so that the player can select any command more simply. By constituting the command menu 208 in this manner, there is no need to distinguish a command category selecting region 208a from a command selecting region 208b.

Next, a concrete example of the list of the selected command to be displayed (Step S414) and reception of command selection (Step S416) will be described with reference to FIG. 11. FIG. 11 is an explanatory drawing that shows a three-dimensional field screen in a state where a predetermined period of time elapses after a target is selected at a state shown in FIG. 3. As shown in FIG. 11, a command display region 208 and a target name display region 209 are displayed on the image display screen 51 of the display device 50. In this case, the list of the selectable commands is displayed in the command display region 208. A character name as the target is displayed in the target name display region 209.

The command display region 208 is constituted from a command category selecting region 208a for selecting a category of a command, and a command selecting region 208b for selecting a command name and command value. A "normal skill", a "special skill", "magic" and an "item" are displayed in the command category selecting region 208a, for example. In the case where the category is the "normal skill", command names such as "battle 1", "battle 2", "steal", "check", "defense 1" and "defense 2" are displayed in ascending order of the command values in the command selecting region 208b. The command values corresponding to the respective commands are displayed at the side of the command names.

The "enemy A" is displayed as the character name of the target in the target name display region 209. Further, since a predetermined period of time elapses from the state shown in FIG. 3, the ATB value in the ATB gauge 207a is added to 25 points, for example. In the case where a lot of commands are selected by the control section 11, a scroll bar is provided in the command selecting region 208b, for example. In this case, a desired command name may be displayed by moving the scroll bar.

The player can determine a command by pressing the lower key 31b of the cross key 31 to move the selection cursor 205, and pressing the circle button 32a to select a command. In the example shown in FIG. 8, the "battle 1" is selected as a command.

Subsequently, in the case where it is determined that the command is selected on the basis of an instruction signal using the keypad 30 from the player ("Yes" at Step S416), the control section 11 stores the selected command in a predetermined data area of the HDD 13, for example (Step S417). The control section 11 then adds the command issuance reserving point of the selected command to an accumulated command issuance reserving point (Step S418), and causes the display device 50 to display the selected command name and the corresponding command issuance reserving point on the image display screen 51 (Step S419). In addition, in the case where a lot of commands are selected, the control section 11 stores the order of the selected commands in a predetermined data area.

Figure 13:
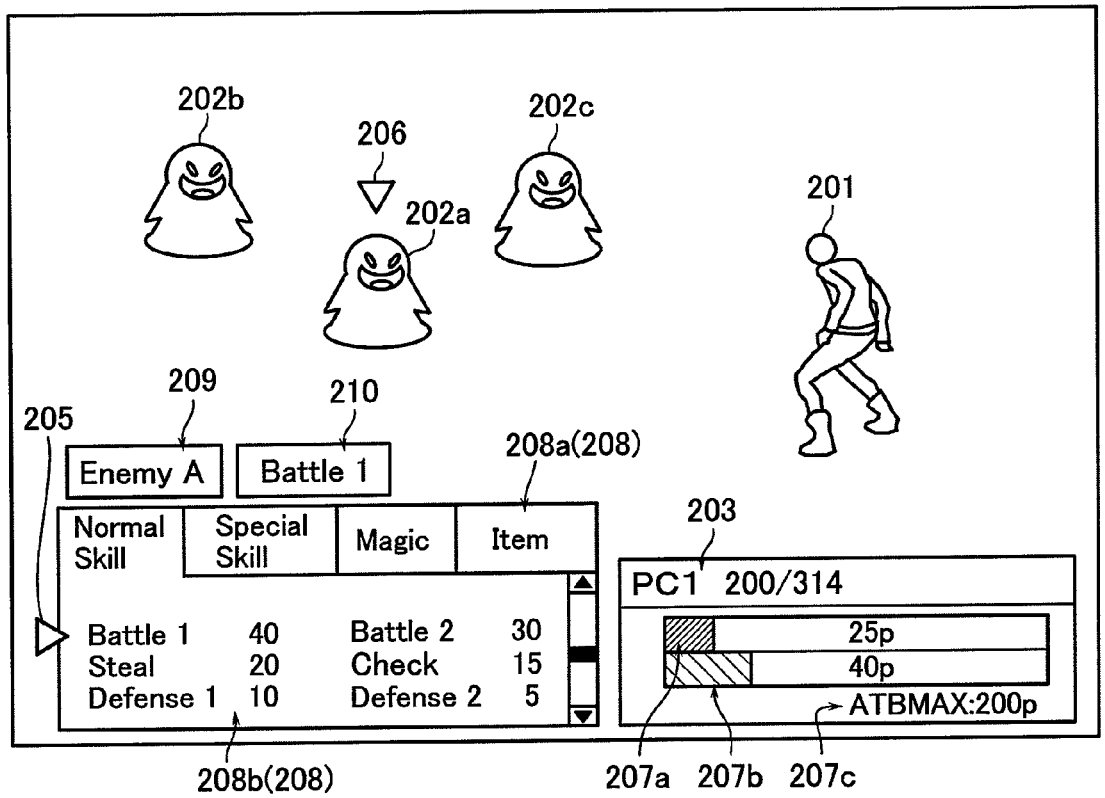
FIG. 13 is an explanatory drawing that shows an example of a three-dimensional field screen in a state where one command is selected at a state shown in FIG. 11.

Here, a concrete example of the display of the selected command name and the command issuance reserving point (Step S419) will be described with reference to FIG. 13. FIG. 13 is an explanatory drawing that shows a three-dimensional field screen in a state where one command is selected at a state shown in FIG. 11. As shown in FIG. 13, a selected command name display region 210 for displaying the selected command name is provided at the side of the target name display region 209 on the image display screen 51. The command issuance reserving point of 40 points is displayed in the command issuance reserving point gauge 207b on the basis of 40 points of the command name "battle 1".

In this regard, the timing of displaying the selected command name display region 210 is not limited to the timing described above. For example, it may be adopted a method in which the same number of display regions as the number of commands that can be specified is provided with "blank state" in advance, and the selected commands are inputted in the blank-state display regions in turn.

On the other hand, in the case where it is determined whether no command is selected by the player ("No" at Step S416), the control section 11 determines whether cancellation of the selected command is received or not (Step S420). Here, in the case where it is determined that the cancellation of the selected command is received by means of press of a predetermined button in the keypad 30 by the player ("Yes" at Step S420), the control section 11 subtracts the command issuance reserving point of the selected command thus stored at Step S417 from the accumulated command issuance reserving point (Step S421). Subsequently, the control section 11 erases the action command (Step S422), and terminates the display of the command name and the command issuance reserving point of the selected action command on the image display screen 51 (Step S423).

Here, a concrete example of termination of the display of the selected command name and the command issuance reserving point (Step S422) will be described with reference to FIG. 13. At the image display screen 51 as shown in FIG. 13, the player can select the command "Battle 1" in the selected command name display region 210 by moving the selection cursor 205 in accordance with press of the cross key 31, or can cancel the command "Battle 1" in accordance with press of the X button 32b. Since the stored command issuance reserving point is erased in response to the cancel of the command, the point indicated by the command issuance reserving point gauge 207b is changed from 40 points to 0 point. Thus, the three-dimensional field screen shown in FIG. 13 is changed to the three-dimensional field screen shown in FIG. 11.

Further, the control section 11 repeatedly executes the command receiving process (Step S202) to store a plurality of commands at Step S417. In this case, the control section 11 adds the command value of the command stored at Step S417, as the command issuance reserving point, to the accumulated command issuance reserving point whenever the control section 11 selects one command. The control section 11 compares the accumulated value of the command issuance receiving point with the maximum value of the ATB value, and adds the command issuance reserving point to the accumulated command issuance reserving point at Step S418. Then, in the case where there is a command whose accumulated value of the command issuance reserving point is over the maximum value of the ATB value, the control section 11 does not select the command at Step S414.

Figure 14:
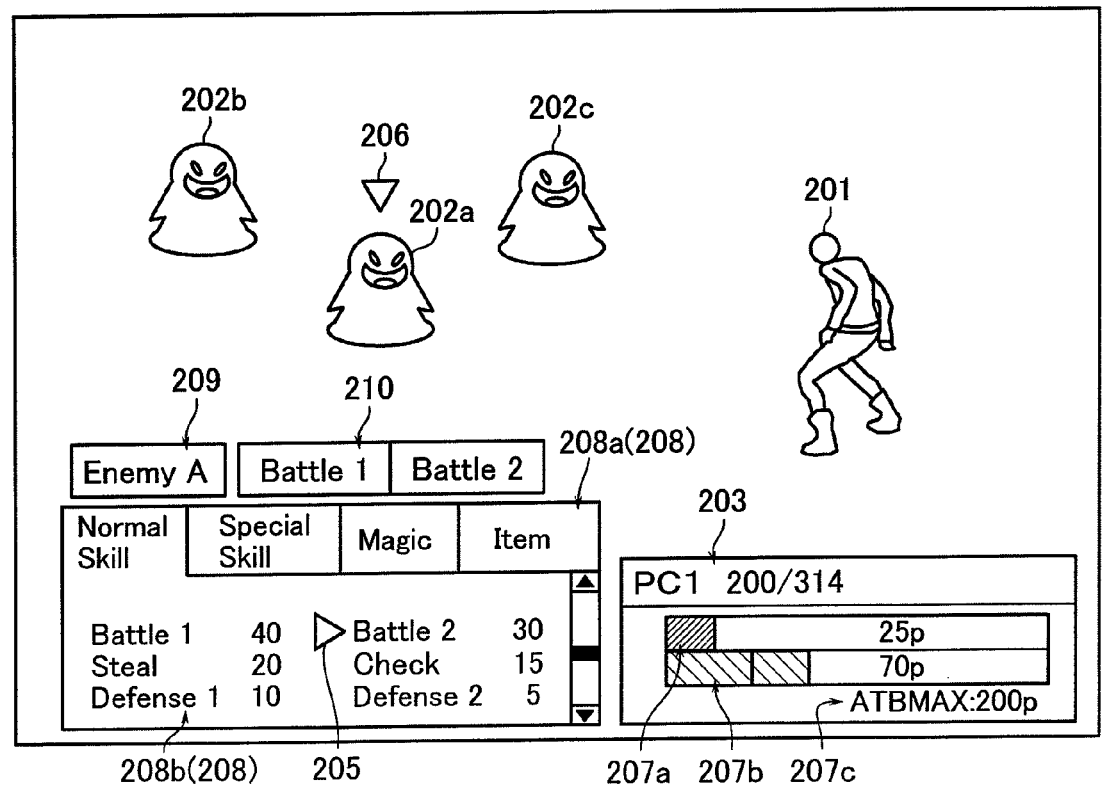
FIG. 14 is an explanatory drawing that shows an example of a three-dimensional field screen in a state where another command is further selected and stored at a state shown in FIG. 13.

Here, the state that a plurality of commands are stored will be described with reference to FIG. 14. FIG. 14 is an explanatory drawing that shows the three-dimensional field screen in a state where another command is further selected and stored at a state shown in FIG. 13. As shown in FIG. 14, the player moves the selection cursor 205 by pressing the cross key 31 to select a command, and determines the command by pressing the circle button 32a. The command "Battle 2" is selected in the example shown in FIG. 14. Since the command "Battle 2" is further selected, the commands "Battle 1" and "Battle 2" are displayed in the selected command name display region 210. The command issuance reserving point of 30 points of the command "Battle 2" is added to the command issuance reserving point of 40 points of the command "Battle 1", whereby the command issuance reserving point of 70 points is displayed in the command issuance reserving point gauge 207b.

Figure 15:
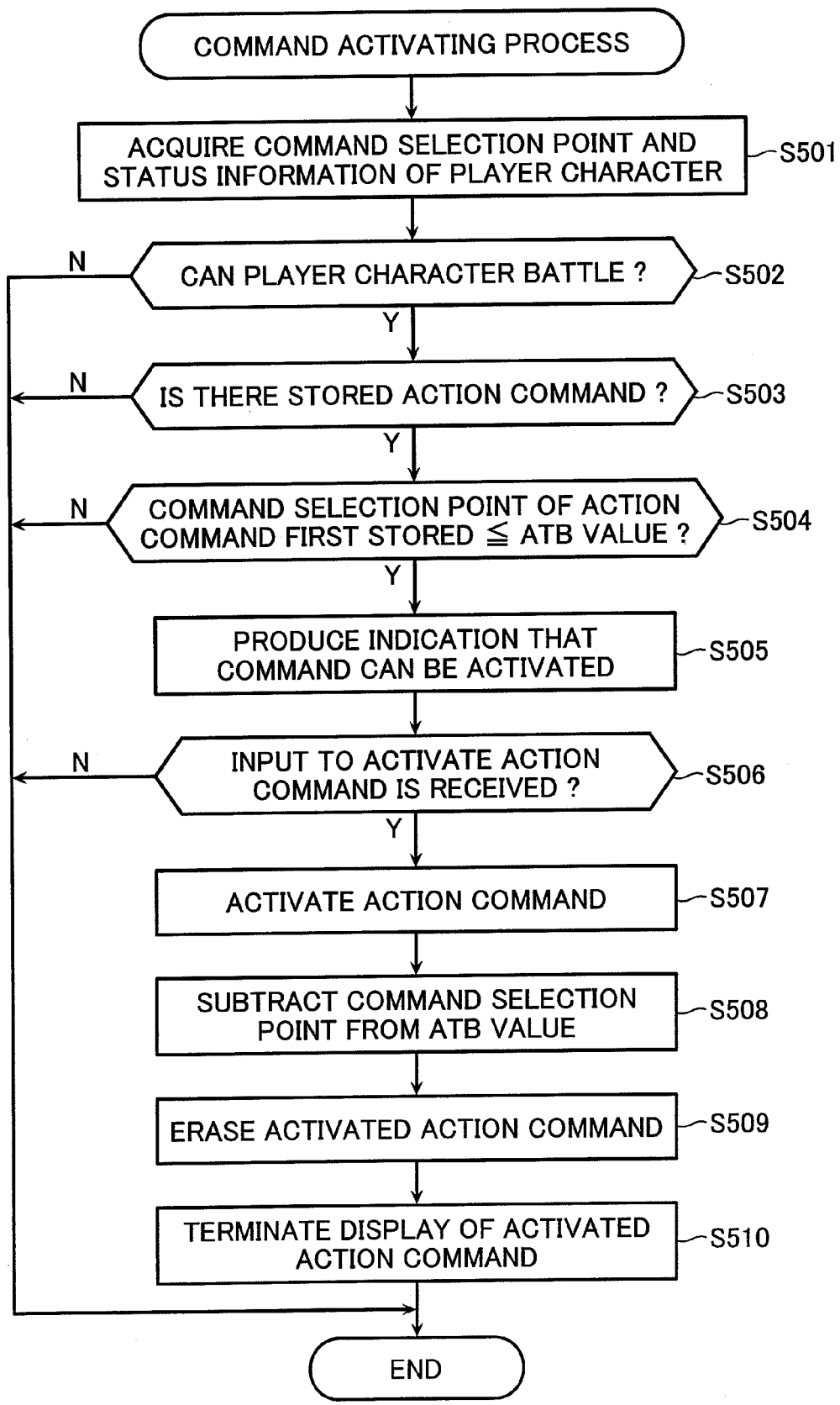
FIG. 15 is a flowchart that illustrates details of a command activating process.

Next, the command activating process described above (Step S203) will be described in detail with reference to FIG. 15. FIG. 15 is a flowchart that illustrates the command activating process.

In the command activating process, the control section 11 first acquires command issuance reserving point and status information of the player character (Step S501). Subsequently, the control section 11 determines, on the basis of the acquired status information of the player character, whether the player character is in a battle possible state or not (Step S502). In the case where it is determined that the player character is in the battle possible state ("Yes" at Step S502), the control section 11 determines whether there is a stored action command or not (Step S503). In the case where it is determined that there is a stored action command ("Yes" at Step S503), the control section 11 further determines whether the accumulated ATB value is the command issuance reserving point of the action command first stored among the received action commands or more or not (Step S504). Further, in the case where it is determined that the accumulated ATB value is the command issuance reserving point of the action command first stored among the received action commands or more ("Yes" at Step S504), the control section 11 executes (or produces) the indication of activation of the command that the command can be activated (Step S505), and receives input of the activation of the command from the player (Step S506). When the control section 11 receives the input of the activation of the command from the player ("Yes" at Step S506), the control section 11 activates the stored action command (Step S507). On the other hand, in the case where it is determined that the player character is not in the battle possible state ("No" at Step S502), in the case where it is determined that there is no stored (that is, received) action command ("No" at Step S503), or in the case where it is determined that the accumulated ATB value is less than the command issuance reserving point of the action command first stored among the received action commands ("No" at Step S504), then the command activating process is terminated.

Figure 16:
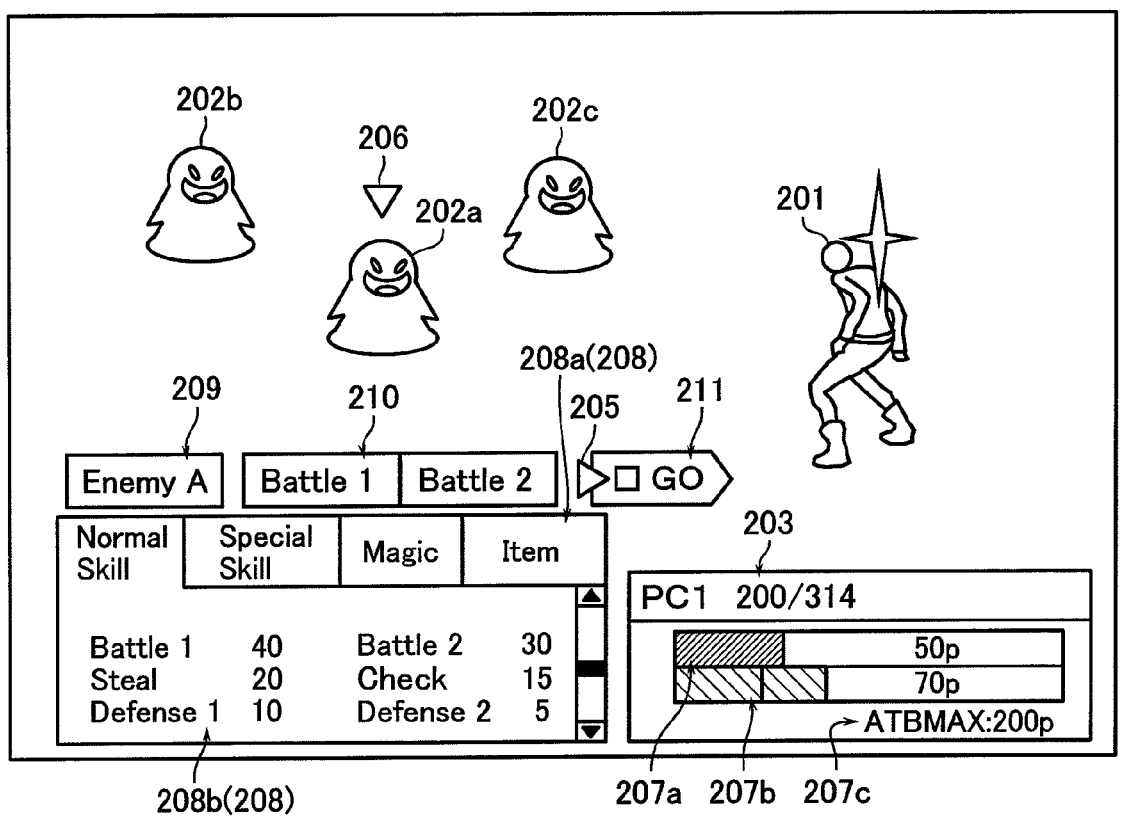
FIG. 16 is an explanatory drawing that shows another example of a three-dimensional field screen in a state where a predetermined period of time elapses from a state shown in FIG. 14.

Here, the indicating process that the command can be activated (Step S505) and the receiving process of the input of input of the activation of the command (Step S506) will be described with reference to FIG. 16. FIG. 16 is an explanatory drawing that shows the three-dimensional field screen in a state where a predetermined period of time elapses at a state shown in FIG. 14. Since the predetermined period of time elapses as shown in FIG. 16, 25 points is added to the ATB value to become 50 points, whereby the ATB value is over the command issuance reserving point of the command "Battle 1" (that is, 40 points). Here, the indication of the command activation, for example, to display the player character so as to be brightened is executed. An activation possible button 211 is displayed at the side of the selected command name display region 210 on the image display screen 51. The player moves the selection cursor 205 by pressing the cross key 31 to select the activation possible button 211, whereby the player can determine to activate the command by pressing the circle button 32a. Alternatively, the player may determine to activate the command by pressing the square button 32d. In this case, the indication of the command activation is not limited to the indication by an image as described above, and the command activation may be indicated by a sound effect.

When the command is activated, the control section 11 subtracts the command issuance reserving point of the activated command from the ATB value (Step S508), and erases the selected command thus stored and then activated (Step S509). The control section 11 then terminates the display of the activated command on the image display screen 51, and displays the subtracted ATB value (Step S510).

Figure 17:
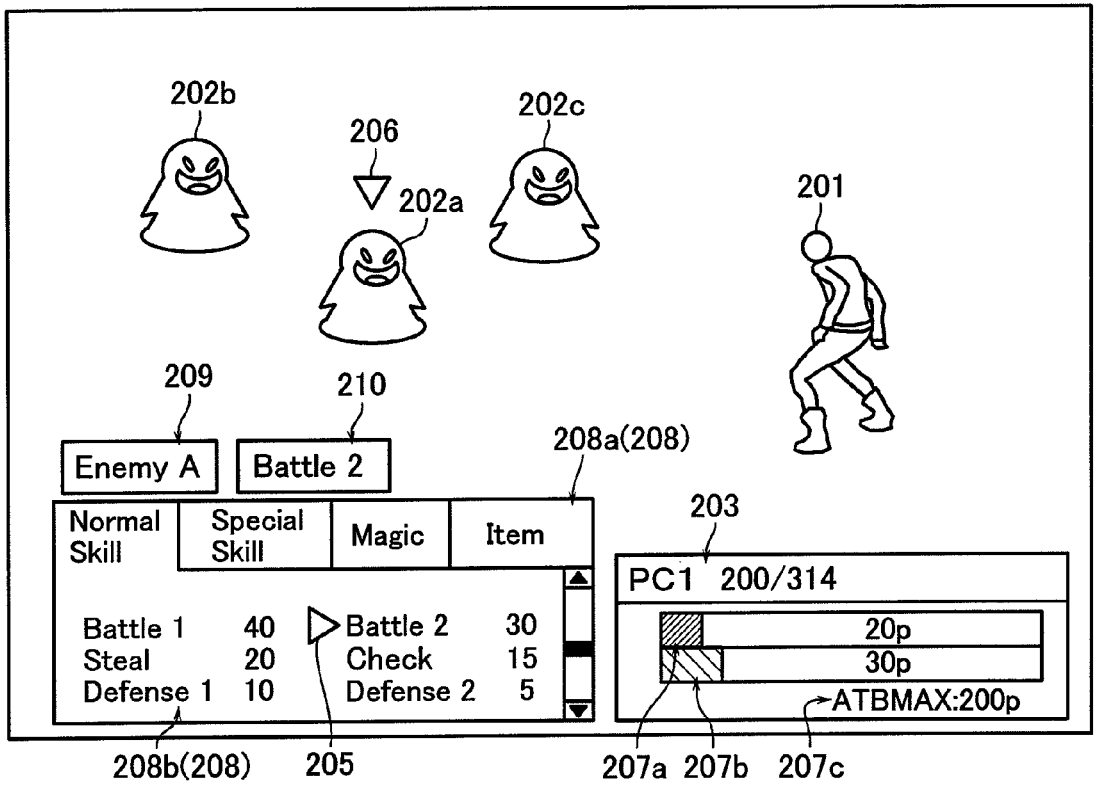
FIG. 17 is an explanatory drawing that shows a three-dimensional field screen in a state where "battle 1" is activated at a state shown in FIG. 16.

For example, when the command "Battle 1" is activated at the state shown in FIG. 16, the three-dimensional field screen becomes the state shown in FIG. 17. Namely, the control section 11 subtracts the command issuance reserving point of 40 points for the command "Battle 1" from the ATB value of 50 points shown in FIG. 16, thereby obtaining 10 points as the ATB value. The obtained value of 10 points is displayed in the ATB gauge 207a. The control section 11 then terminates the display of the command "Battle 1" in the selected command name display region 210, which has already been selected to be activated. Further, the control section 11 may terminate the display of the command "Battle 2" in the selected command name display region 210 at the same time of the termination of the display of the command "Battle 1".

Figure 18:
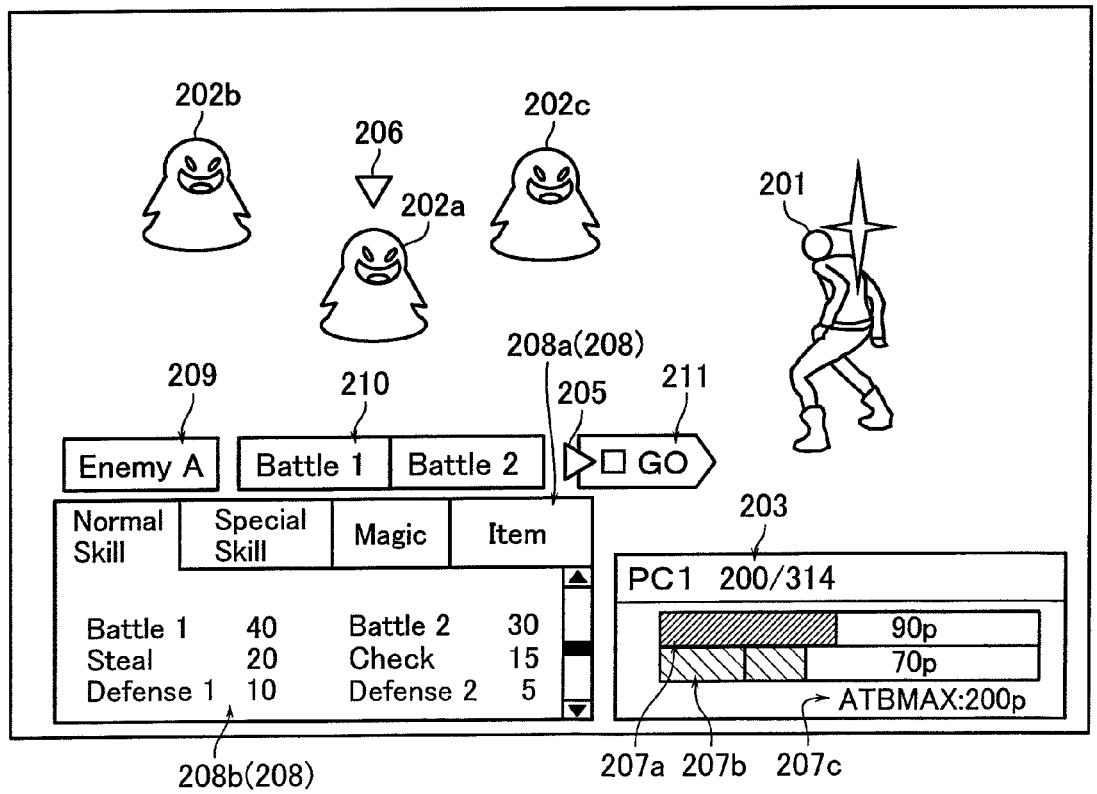
FIG. 18 is an explanatory drawing that shows another example of a three-dimensional field screen in a state where a predetermined period of time elapses from a state shown in FIG. 16.

Further, as shown in FIG. 18, the action command can be activated at the state where a predetermined period of time elapses from the state shown in FIG. 16. FIG. 18 is an explanatory drawing that shows the three-dimensional field screen in a state where a predetermined period of time elapses from a state shown in FIG. 16. Since the predetermined period of time elapses from the state shown in FIG. 16, as shown in FIG. 18, the ATB value is changed from 50 points to 90 points by means of addition. In this case, the ATB value of 90 points is over 70 points that is a value obtained by adding the command issuance reserving point of the command "Battle 2" to that of the command "Battle 1". Thus, the player may select an activation possible button 211 and press the circle button 32a, whereby the player can determine to activate the command "Battle 1" or "Battle 2". In this case, the player can select the activation possible button 211 at the first press to activate the command "Battle 1", and select the activation possible button 211 at the second press to activate the command "Battle 2". Alternatively, when the player selects the activation possible button 211 at the first press (that is, once), the control section 11 may activate the commands "Battle 1" and "Battle 2" sequentially.

Figure 19:
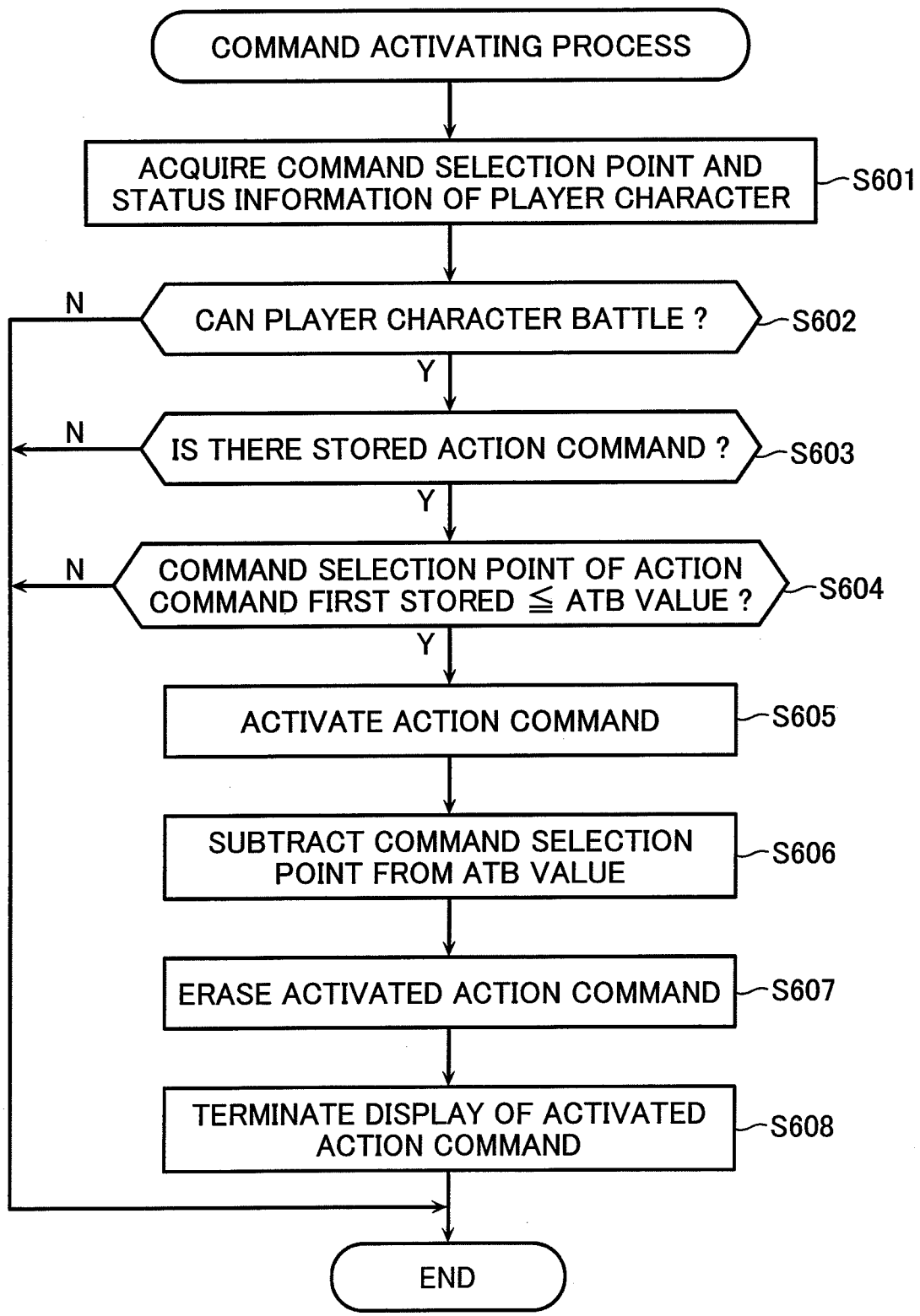
FIG. 19 is a flowchart that illustrates details of a command activating process in another embodiment.

Moreover, in the embodiment described above, the video game apparatus 100 is constructed as follows. Namely, in the case where the condition (relationship) that the command issuance reserving point of the action command first stored is the ATB value or less is met ("Yes" at Step S504), the control section 11 executes the indication of activation of the command that the command can be activated (Step S505), and receives the input of the activation of the command from the player (Step S506). The present invention is not limited to such a construction. For example, as shown in FIG. 19, the command activating process may be constituted from the processes at Steps S601 to S608 that correspond to the processes at Steps S501 to S504 and Steps S507 to S510 as described above, that is, the processes in which the processes at Steps S505 and S506 are eliminated from the command activating process shown in FIG. 15.

As explained above, in the embodiment described above, the video game processing apparatus is constructed as follows. Namely, the control section 11 monitors the accumulated value of the ATB value to which a predetermined ATB value is added every predetermined period of time and the command value set to each of the commands which is stored as the command issuance reserving point in response to the specification of the action command. In the case where the command issuance reserving point is the accumulated value of the ATB value or less, the control section 11 subtracts the accumulated value of the command issuance reserving point from the accumulated value of the ATB value, and then activates the stored command. The time required to activate a command can be changed for every command. Thus, it is possible to improve realism (realistic sensation) in a battle scene of the video game, and this makes it possible to improve interest in the video game of a player. Further, since the video game apparatus 100 is constructed so that the control section 11 activates the accumulated and stored commands, the player can execute the commands in combination and sequentially. Moreover, the video game apparatus 100 is constructed so that any auto-ability can be set to the player character in exchange for a part of the accumulated ATB value (on condition that the accumulated maximum ATB value is caused to be lowered). Thus, it is possible to widen a variety of the video game further, and it is possible to improve interest of the player in the video game.

The control section 11 selects a command in the case where the command value lower than the subtracted value obtained by subtracting the accumulated value of the command issuance reserving point of each of the received commands from the accumulated value of the ATB value is set to the command, and there is an action command in which flag information indicating whether or not the action command can be specified as an action of the player character is set to a specification possible state (Step S414). Thus, since it is necessary for the player to consider a method of clearing the video game, this makes it possible to improve interest of the player in the video game.

The control section 11 causes the display device 50 to display the commands in ascending order of the command value thereof (Step S415). Thus, the player can find the desired command easily.

In the case where it is determined that the action command can be activated, the control section 11 executes the process for receiving instruction of activation of the action command from the player (Step S506). Thus, the player can activate the action command at predetermined desired timing, and this makes it possible to improve interest of the player in the video game.

The video game apparatus 100 is constructed so that the control section 11 executes the indication for indicating that the command can be activated in the case where it is determined that the command can be activated. Thus, it is possible to visually inform the player that the command can be activated. In addition, it is possible to prevent the player from fixing his eyes on the ATB gauge 207a and thereby overlooking the indicated image of the video game.

The video game apparatus 100 is constructed so that the control section 11 can store action commands up to a predetermined upper limit number in a predetermined data area, and receive only the predetermined upper limit number of action commands (Step S412). Further, the upper limit number is determined on the basis of the state (status information) of the player character and accumulated execution time of the video game. Thus, it is possible to improve interest of the player in the video game.

The video game apparatus 100 is constructed so that the control section 11 determines the predetermined added value of the ATB value and whether or not the predetermined ATB value is added to the accumulated ATB value on the basis of the state (status information) of the player character and the accumulated execution time of the video game (Steps S301 and S302), whereby a parameter to determine the predetermined ATB value to be added is set. Thus, since it is necessary for the player to consider a method of clearing the video game, this makes it possible to improve interest of the player in the video game.

The video game apparatus 100 is constructed so that the control section 11 determines the predetermined ATB value (added value) on the basis of at least one of the state (status information) of the player character and the accumulated execution time of the video game, and adds the determined predetermined ATB value to the accumulated ATB value (Step S305). A parameter to determine the predetermined ATB value is thereby determined. Thus, since it is necessary for the player to consider a method of clearing the video game, this makes it possible to improve interest of the player in the video game.

The video game apparatus 100 is constructed so that the control section 11 receives an instruction to erase the action command on the basis of operations of the player, and erases the stored action command when the instruction to erase the action command is received (Steps S420 to S423). Thus, it is possible to erase the action command, for example, in the case where the player inputs the action command by mistake.

The video game apparatus 100 is constructed so that the control section 11 receives an instruction to erase the auto-ability on the basis of operations of the player, and erase the stored auto-ability when the instruction to erase the auto-ability is received (Steps S408 to S411). Thus, it is possible to erase the auto-ability, for example, in the case where the player inputs the auto-ability by mistake.

The video game apparatus 100 is constructed so that the control section 11 causes the display device 50 to display the indication that auto-ability is applied to the player character (see FIG. 9). Thus, the player is allowed to easily know whether auto-ability is applied to the player character or not.

In the embodiment described above, the video game apparatus 100 is constructed so that the control section 11 activates an action command in the case where the ATB value is the command value of the action command first selected or more, or in the case where the ATB value is at least the command value of the action command first selected when there is an instruction to activate the action command from the player. The video game apparatus 100 may be constructed so that the control section 11 receives a reservation to activate one action command or two or more action commands in advance at the command receiving process, and activates the action command(s) reserved to activate at the command activating process when the accumulated value of the command issuance reserving point of the action command(s) reserved to activate is the accumulated value of the ATB value or less. In this case, in the case where a plurality of action commands are reserved to activate, the control section 11 may activate the plurality of action commands sequentially (continuously). Hereinafter, such a processing flow will be described in detail with reference to FIGS. 20 to 22.

Figure 20:
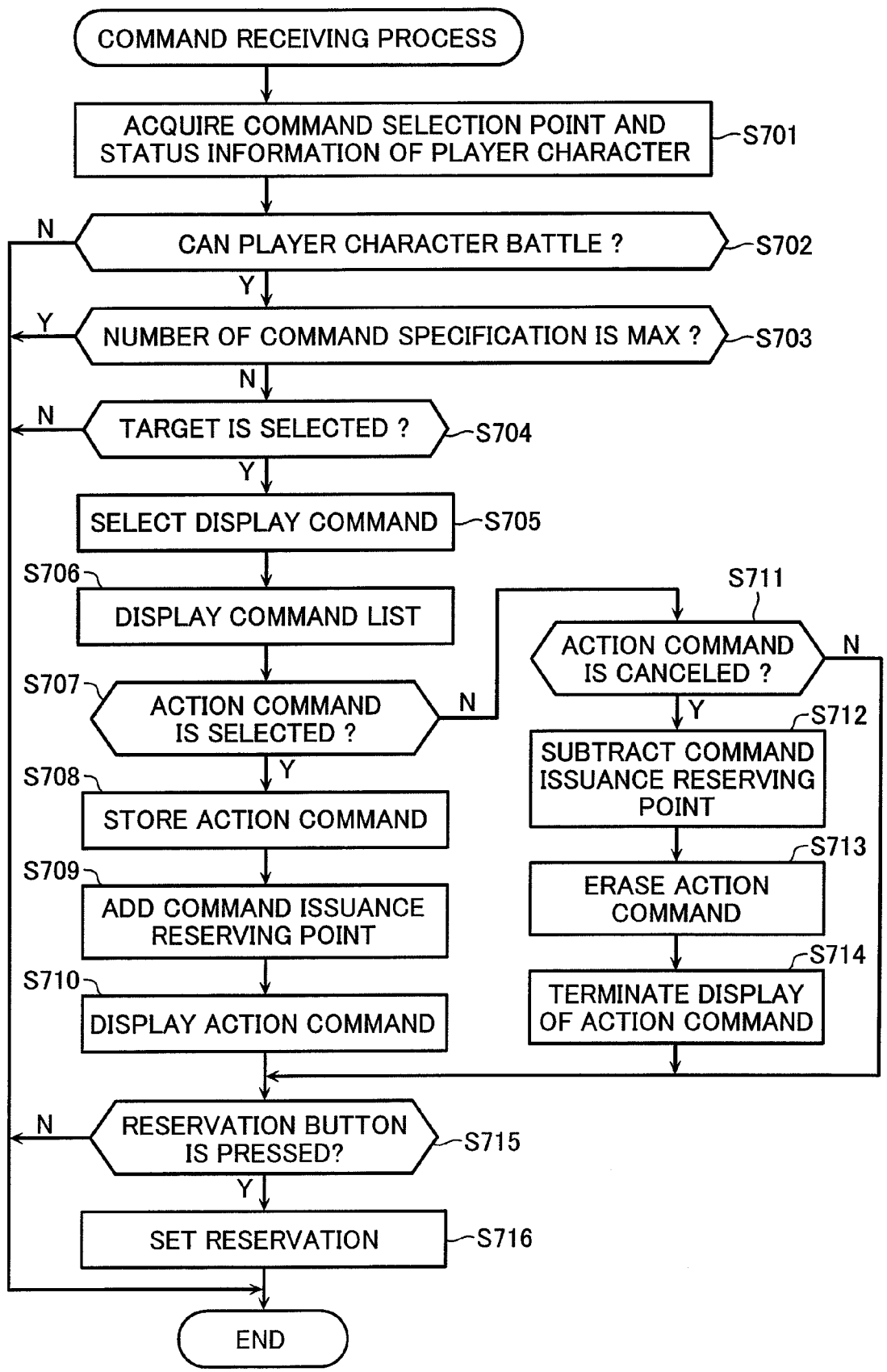
FIG. 20 is a flowchart that illustrates another example of a command receiving process in which activation of a command can be reserved.

FIG. 20 is a flowchart that illustrates another example of the command receiving process in which activation of a command can be reserved. As shown in FIG. 20, the processes at Steps S701 to S714 are similar to those at Steps S401 to S402 and Steps S412 to S423 as described above (see FIG. 6). However, the command receiving process shown in FIG. 20 is different from the command receiving process shown in FIG. 6 in view of the following processes. Namely, the control section 11 receives a reservation to activate the stored action commands (Step S715) after the processes in case of receiving selection of the action command (Steps S708 to S710) or the processes in case of receiving cancellation of the action command (Steps S711 to S714). When a press operation of a reservation button in the keypad 30 (for example, the triangle button 32c) by the player is detected ("Yes" at Step S715), the control section 11 executes a reservation setup to activate an action command (Step S716). In this regard, although this embodiment is different from the embodiment described above, the control section 11 may select such an action command at Step S705 even in the case where there is an action command whose accumulated value of the command issuance reserving point is over the maximum value of the ATB value.

A reservation to activate action commands that have not been reserved to activate yet among the action commands stored at Step S708 is set, and the reservation is stored in a predetermined data area together with reservation order thereof at Step S716. More specifically, in the case where a press operation of the reservation button is detected when action commands A, B and C that have not been reserved to activate are selected and stored, activation of the three action commands A, B and C is reserved as "reservation order 1". Then, in the case where a press operation of the reservation button is detected when action commands D and E that have not been reserved to activate are further selected and stored before the activation of the action command A, B and C, activation of the two action commands D and E is reserved as "reservation order 2".

Figure 21:
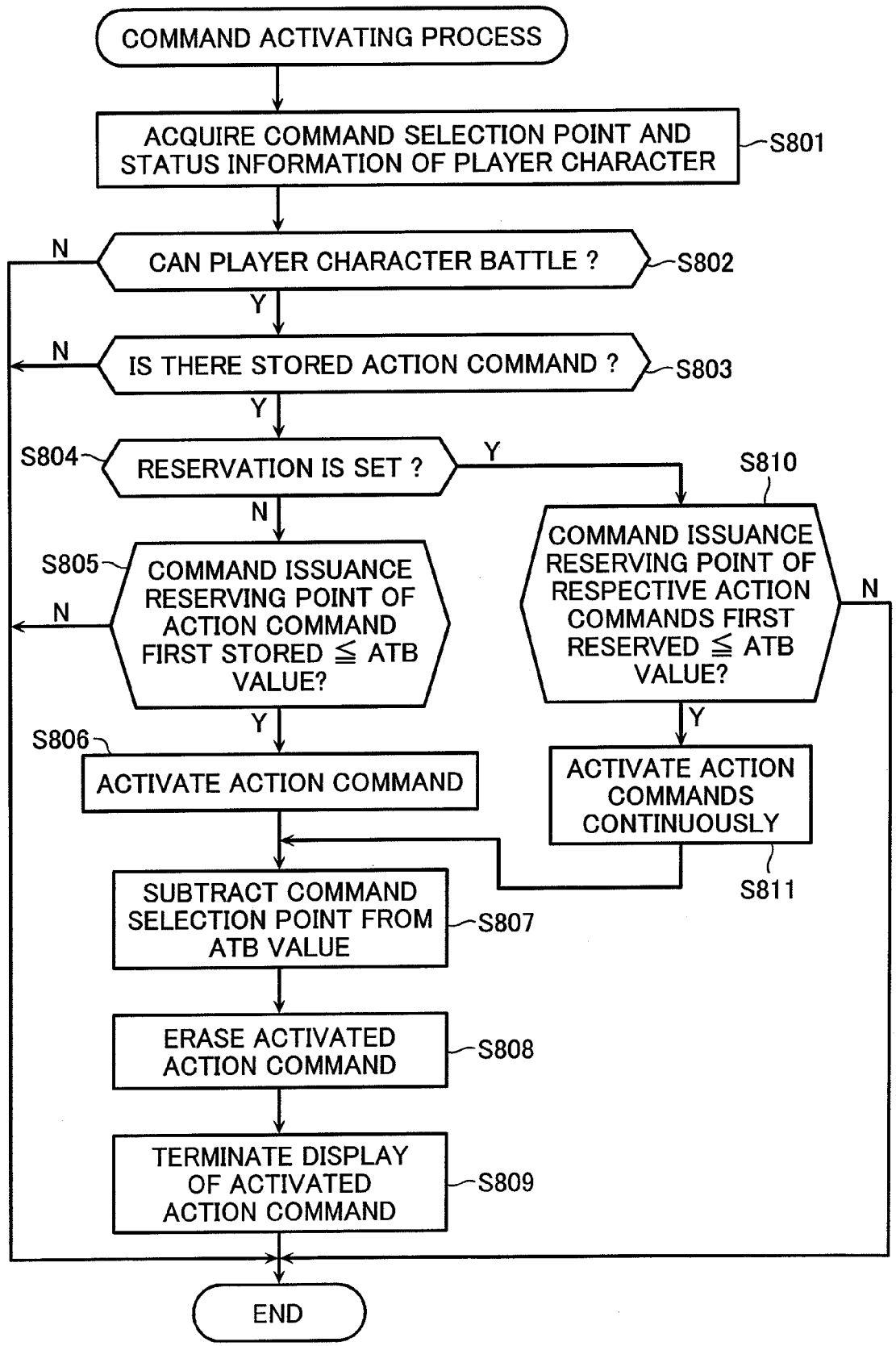
FIG. 21 is a flowchart that illustrates another example of a command receiving process in which activation of a command can be reserved.

FIG. 21 is a flowchart that illustrates another example of the command receiving process in which activation of a command can be reserved. As shown in FIG. 21, the processes at Steps S801 to S803 and Steps S805 to S809 are similar to those at Steps S601 to S603 and Steps S604 to S608 as described above (see FIG. 19). However, the command activating process shown in FIG. 21 is different from the command activating process shown in FIG. 19 in view of the following processes. Namely, in the case where there is a stored action command ("Yes" at Step S803), the control section 11 determines whether or not a reservation to activate an action command is set (Step S804). In the case where it is determined that the reservation to activate the action command is set ("Yes" at Step S804), the control section 11 determines whether or not the accumulated ATB value is the accumulated value of the command issuance reserving points of the action commands first reserved to activate or more (Step S810). In the case where it is determined that the accumulated ATB value is the accumulated value of the command issuance reserving points of the action commands first reserved to activate or more ("Yes" at Step S810), the control section 11 activates the action commands thus reserved sequentially (Step S811). In this regard, in the case where the reservation is set for one action command, the control section 11 activates the one action command. Subsequently, the control section 11 executes the processes at Steps S087 to S809, and the command activating process is then terminated. On the other hand, in the case where it is determined that the accumulated ATB value is less than the accumulated value of the command issuance reserving points of the action commands first reserved to activate ("No" at Step S810), the control section 11 terminates the command activating process. Further, in the case where it is determined that a reservation to activate an action command is not set ("No" at Step S804), the control section 11 executes the processes at Steps S805 to S809, and the command activating process is then terminated.

Figure 22:
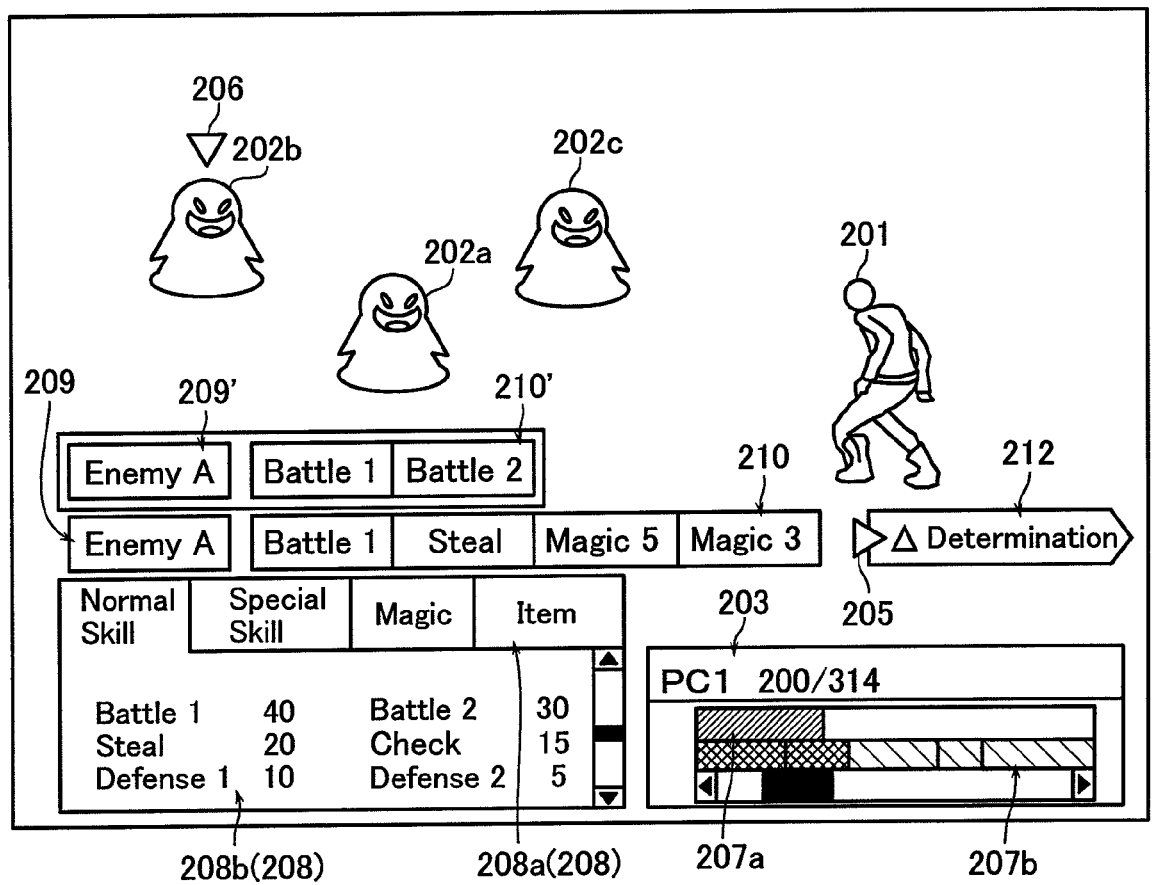
FIG. 22 is an explanatory drawing that shows a three-dimensional field screen when the setting for a reservation of activation of a command is received.

Here, a concrete example of the reservation setup of the action command and the activation of the reserved action command will be described with reference to FIG. 22. FIG. 22 is an explanatory drawing that shows a three-dimensional field screen when the setting for a reservation of activation of a command is received. As shown in FIG. 22, the target name display region 209 and the selected command name display region are displayed on the image display screen 51, and a reservation determination button 212 is displayed at the side of regions 209 and 210. The player moves the selection cursor 205 by pressing the cross key 31 to select the reservation determination button 212, whereby the player can determine to reserve the command by pressing the circle button 32a. Alternatively, the player may determine to activate the command by pressing the triangle button 32c. In the example shown in FIG. 22, a reservation-determined target name display region 209' and a reservation-determined selected command name display region 210' are displayed on the upper part of the target name display region 209. In the case where a plurality of action commands are reserved to activate, groups of the action commands that the activation reservation is set are displayed in display lines, respectively. Further, in the case where the plurality of groups of action commands are reserved to activate, the command issuance reserving point gauge 207b is displayed so that display colors are respectively changed for the reservations of the groups the action commands. Thus, the player is allowed to confirm the groups of the action commands.

Further, in the example shown in FIG. 22, an "Enemy A", a "Battle 1 (command issuance reserving point: 40 points)" and a "Battle 2 (command issuance reserving point: 30 points)" are respectively set as a target and action commands reserved to activate. Thus, at the time when the ATB value becomes 70 points (that is, 30 points+40 points=70 points), the action commands "Battle 1" and "Battle 2" are automatically activated sequentially.

Moreover, in the another embodiment described above, when the ATB value added in accordance with lapse of time becomes the accumulated value of the command issuance reserving points of the action commands that have been reserved to activate earliest among the action commands reserved to activate or more, the control section 11 subtracts the accumulated value of the action commands value of the action commands thus reserved to activate from the accumulated ATB value, and activates the action commands sequentially. Thus, it is possible to activate the action commands in group units sequentially. This makes it possible to heighten realism (realistic sensation) of the video game, and it is possible to improve interest in the video game. In addition, since the accumulated and stored action commands are reserved and activated, the control section 11 can execute the action commands in combination sequentially. Since the player is required to constantly consider the ATB value and the accumulated value of the command issuance reserving points and to select and specify the command, it is possible to increase interest in the video game.

In the example described above, the video game apparatus 100 is constructed so that the action commands reserved to activate are activated sequentially when the accumulated value of the command issuance reserving points of the reserved action commands becomes the accumulated value of the ATB value or less. The video game apparatus 100 may be constructed so that the control section 11 determines a special action command in accordance with a combination of the action commands reserved to activate, and activates the special action command. In this case, a special indication determining table in which special action commands for activating different kinds of special indications respectively correspond to various combinations of a plurality of action commands reserved to activate may be prepared in advance, and the control section 11 may determine a special action command to be activated using the special indication determining table. In this regard, the order of the combinations may be specified, or may not be specified. By constructing the video game apparatus 100 in this manner, a special indication to activate in accordance with a combination of a plurality of action commands that are selected by the player and reserved to activate can be determined, and the control section 11 can execute the determined special indication. In this regard, the special action command is not determined in accordance with the combination of the plurality of action commands, but the special action command may be determined in accordance with the number of selected action commands.

Further, in the embodiment described above, the video game apparatus 100 is constructed so that the control section 11 activates the action command in the case where the ATB value becomes the command value of the action command first selected or more, or in the case where the ATB value is at least the command value of the action command first selected or more when the player instructs to activate the action command. The video game apparatus 100 may be constructed to that the control section 11 in turn activates the action commands sequentially in accordance with received order (that is, the order selected by the player) when the ATB value becomes the accumulated value of the action command values of the received action commands (one action command or two or more action commands selected by the player) or more. Since the video game apparatus 100 is constructed in this manner, by comparing the ATB value added in accordance with lapse of time with the accumulated value of the action command values of the received action commands, the control section 11 can activate the received action commands in turn when the ATB value becomes the accumulated value of the action command values or more, and subtract the action command values of the activated action commands from the ATB value. Namely, since the ATB value required to activate a command (that is, lapse of time) is differentiated for every action command, it is possible to heighten realism (realistic sensation) of the video game, and it is possible to improve interest in the video game. In addition, since the accumulated and stored action commands are in turn activated in accordance with received order, it is possible to execute the action commands in combination and sequentially. For this reason, the player is required to constantly calculate the action command values and/or the accumulated value of the ATB value, to further consider what action command is to be selected and what order the action commands are selected, and to select and specify the action commands, it is possible to increase interest in the video game.

In this regard, although it has not been referred particularly in the embodiment described above, the control section 11 does not execute normal actions corresponding to the action commands sequentially, but the control section 11 may execute a special action different from the normal actions. As for the special action, for example, it is considered a predetermined special weapon (deadly technique) that cannot be activated normally by the action commands. In this case, a special weapon determining table in which various kinds of special weapons respectively correspond to various combinations of a plurality of action commands may be prepared in advance, and the control section 11 may determine a special weapon to be activated using the special weapon determining table. In this regard, the order of the combinations may be specified, or may not be specified. By constructing the video game apparatus 100 in this manner, a special weapon to be activated in accordance with a combination of a plurality of action commands selected by the player can be determined, and the control section 11 can execute the determined special weapon. In this regard, the special weapon to be activated is not determined in accordance with the combination of the plurality of action commands, but the special weapon to be activated may be determined in accordance with the number of selected action commands.

Further, although it has not been referred particularly in the embodiment described above, the control section 11 may receive a plurality of action commands, and activate the action commands that can be activated at the same time at once when it is determined to activate the plurality of action commands. For example, when the control section 11 receives an action command for specifying recovery magic to a friend character and an action command for specifying a attack against an enemy character, both of the received action commands may be activated at once when the ATB value becomes the accumulated value of the action command values of the received action commands or more. By constructing the video game apparatus 100 in this manner, it is possible to increase variations of indication in the video game, and this makes it possible to improve interest of the player in the video game.

Moreover, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the present invention.

Furthermore, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

Further, although an aspect of the present invention has been described with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the present invention.

Moreover, in the embodiment described above, it has been described that game data for causing the video game apparatus main body 10 (video game apparatus 100) to execute the various processes described above (that is, various data such as control program data used for the video game) are stored in the storage medium 70. However, the present invention is not limited thereto. The video game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the embodiment described above, such data may include at least control program data for causing a computer to execute the image generating process in the embodiment as described above.

The present invention can be applied to a video game machine, a personal computer, a cellular phone terminal, a portable game apparatus or the like, or any combination thereof that causes an image display apparatus to display a player character on an image display screen, and controls progress of a video game by controlling an action of the player character displayed on the image display screen in response to an operation by a player. Therefore, the present invention is useful.

What is claimed is:

1. A video game processing apparatus that causes an image display apparatus to display a player character on an image display screen of the image display apparatus, the video game processing apparatus controlling a progress of a video game by controlling an action of the player character in accordance with operations by a player, the video game processing apparatus comprising:

a time point adder that adds a predetermined time point to an accumulated time point value in accordance with a lapse of time, the accumulated time point value being at most equal to a maximum time point value;

an accumulated time point displayer that displays, on the image display screen, the accumulated time point value and the maximum time point value;

a special effect specification receiver that receives, in accordance with the operations by the player, a specification of a special effect, the special effect corresponding to a special effect value;

a received special effect memory that stores the special effect received by the special effect specification receiver in correspondence with the special effect value;

a maximum time point value subtracter that subtracts the special effect value from the maximum time point value when the special effect specification receiver receives the specification of the special effect;

a special effect applier that applies the special effect to the player character when the special effect specification receiver receives the specification of the special effect;

an action command displayer that displays, on the image display screen, at least one selectable action command from among a plurality of action commands, each of the plurality of action commands corresponding to an action command value, the action command value of each of the at least one selectable action command being at most equal to a difference between the maximum time point value and an accumulated action command value;

an action command receiver that receives specification of at least one received action command from among the at least one selectable action command for specifying an action of the player character;

an accumulated action command value adder that adds the action command value of the at least one received action command to the accumulated action command value when the action command receiver receives the specification of the at least one received action command;

an action command memory that stores the at least one received action command and a received order of the at least one received action command;

an action command activator that activates an earliest received action command from among the at least one received action command when the accumulated time point value is at least equal to the action command value of the earliest received action command; and a time point subtracter that subtracts the action command value of the earliest received action command from the accumulated time point value and from the accumulated action command value when the action command activator activates the earliest received action command.

2. The video game processing apparatus according to claim 1, further comprising:

an action command activating instruction receiver that receives an instruction to activate the earliest received action command in accordance with the operations by the player, wherein the action command activator determines that the earliest received action command is activatable when the accumulated time point value is at least equal to the action command value of the earliest received action command and activates the earliest received action command when the earliest received action command is activatable and when the action command activating instruction receiver receives the instruction to activate the earliest received action command.

3. The video game processing apparatus according to claim 2, further comprising:

an activation possible indicator that displays, on the image display screen, an indication that indicates that the earliest received action command is activatable.

4. The video game processing apparatus according to claim 1, wherein the action command receiver receives the specification of up to a predetermined number of the at least one received action command.

5. The video game processing apparatus according to claim 1, further comprising:

an action command erasing instruction receiver that receives, in accordance with the operations by the player, an instruction to erase one of the at least one received action command stored in the action command memory; and an action command eraser that erases the one of the at least one received action command when the action command erasing instruction receiver receives the instruction.

6. The video game processing apparatus according to claim 1, further comprising:

a special effect terminating instruction receiver that receives, in accordance with the operations by the player, an instruction to terminate the special effect applied to the player character;

a maximum time point value adder that adds the special effect value that corresponds to the special effect to the maximum time point value when the special effect terminating instruction receiver receives the instruction to terminate the special effect; and a special effect eraser that erases the special effect stored in the received special effect memory when the special effect terminating instruction receiver receives the instruction to terminate the special effect.

7. The video game processing apparatus according to claim 1, further comprising:

a special effect indicator that displays, on the image display screen, an indication that indicates that the special effect is applied to the player character when the special effect applier applies the special effect to the player character.

8. A video game processing apparatus that causes an image display apparatus to display a player character on an image display screen of the image display apparatus, the video game processing apparatus controlling a progress of a video game by controlling an action of the player character in accordance with operations by a player, the video game processing apparatus comprising:

a time point adder that adds a predetermined time point to an accumulated time point value in accordance with a lapse of time, the accumulated time point value being at most equal to a maximum time point value;

an accumulated time point displayer that displays, on the image display screen, the accumulated time point value and the maximum time point value;

a special effect specification receiver that receives, in accordance with the operations by the player, a specification of a special effect, the special effect corresponding to a special effect value;

a received special effect memory that stores the special effect received by the special effect specification receiver in correspondence with the special effect value;

a maximum time point value subtracter that subtracts the special effect value from the maximum time point value when the special effect specification receiver receives the specification of the special effect;

a special effect applier that applies the special effect to the player character when the special effect specification receiver receives the specification of the special effect;

an action command displayer that displays, on the image display screen, at least one selectable action command from among a plurality of action commands, each of the plurality of action commands corresponding to an action command value, the action command value of each of the at least one selectable action command being at most equal to a difference between the maximum time point value and an accumulated action command value;

an action command receiver that receives specification of at least one received action command from among the at least one selectable action command for specifying an action of the player character;

an accumulated action command value adder that adds the action command value of the at least one received action command to the accumulated action command value when the action command receiver receives the specification of the at least one received action command;

an action command memory that stores the at least one received action command and a received order of the at least one received action command;

an action command activator that sequentially activates the at least one received action command in accordance with the received order of the at least one received action command when the accumulated time point value is at least equal to the action command value of the at least one received action command; and a time point subtracter that subtracts the action command value of the at least one received action command from the accumulated time point value and from the accumulated action command value when the action command activator activates the at least one received action command.

9. A video game processing apparatus that causes an image display apparatus to display a player character on an image display screen of the image display apparatus, the video game processing apparatus controlling progress of a video game by controlling an action of the player character to be displayed on the image display screen in accordance with operations by a player, the video game processing apparatus comprising:

a time point adder that adds a predetermined time point to an accumulated value of the time point in accordance with lapse of time;

an accumulated time point display controller that causes the image display apparatus to display the accumulated value of the time point and an accumulated maximum value of the time point on the image display screen;

a special effect specification receiver that receives a specification of a special effect on condition that the accumulated maximum value of the time point is caused to be lowered, the special effect being applied to the player character;

a received special effect memory in which the special effect received by the special effect specification receiver and a special effect applied value set to the special effect are corresponded and then stored;

an accumulated maximum value subtracter that subtracts the special effect applied value stored in the received special effect memory as the specific effect applied value set to the received special effect from the accumulated maximum value of the time point when the special effect specification receiver receives the specification of the special effect;

a special effect applier that renews a status of the player character for applying the special effect such as attacking power-up, defending power-up to the player character when the special effect specification receiver receives the specification of the special effect;

an action command selector that selects an action command having an action command value less than a subtracted value obtained by subtracting an accumulated value of action command values of received action commands from the accumulated maximum value of the time point;

an action command displayer that displays at least one of selected action commands on the image display screen as a list;

an action command receiver capable of receiving specification of action commands for specifying an action of the player character;

an action command memory in which the action commands received by the action command receiver and an action command value set to each of the action commands are made to correspond to each other and then stored;

an action command activation reserving instruction receiver that receives an instruction to reserve activation of the action commands on the basis of operations of the player;

an activation reserving setter that sets a reservation to activate at least one action command that has not been reserved to activate yet among the action commands stored in the action command memory when the action command activation reserving instruction receiver receives the instruction to reserve activation of the action commands;

an action command activator that monitors the accumulated value of the time point, the action command activator activating the at least one action command or a special action command of the at least one action command when the accumulated value of the time point is at least equal to the accumulated value of the action command value of the at least one action commands which is stored in the action command memory and whose activation reserving order is the earliest among the action commands that have already reserved to activate, the special action command being determined in accordance with a combination of the at least one action command; and a time point subtracter that subtracts the action command value stored in the action command memory of the activated at least one action command from the time point when the action command activator activates the at least one action command or the special action command.

10. A non-transitory computer-readable medium tangibly encoded with a computer program product for processing a video game, a progress of the video game being controlled by causing an image display apparatus to display a player character on an image display screen of the image display apparatus, an action of the player character being controlled in accordance with operations by a player, the computer program product causing a computer to execute:

adding a predetermined time point to an accumulated time point value in accordance with a lapse of time, the accumulated time point value being at most equal to a maximum time point value;

displaying, on the image display screen, the accumulated time point value and the maximum time point value;

receiving, in accordance with the operations by the player, a specification of a special effect, the special effect corresponding to a special effect value;

storing, in a receiving special effect memory, the special effect in correspondence with the special effect value;

subtracting the special effect value from the maximum time point value when the specification of the special effect is received;

applying the special effect to the player character when the specification of the special effect is received;

displaying, on the image display screen, at least one selectable action command from among a plurality of action commands, each of the plurality of action commands corresponding to an action command value, the action command value of each of the at least one selectable action command being at most equal to a difference between the maximum time point value and an accumulated action command value;

receiving specification of at least one received action command from among the at least one selectable action command for specifying an action of the player character;

adding the action command value of the at least one received action command to the accumulated action command value when the specification of the at least one received action command is received;

storing, in an action command memory, the at least one received action command and a received order of the at least one received action command;

activating an earliest received action command from among the at least one received action command for executing an action associated with the earliest received action command by the player character when the accumulated time point value is at least equal to the action command value of the earliest received action command; and subtracting the action command value of the earliest received action command from the accumulated time point value and from the accumulated action command value when the earliest received action command is activated.

11. A non-transitory computer-readable medium tangibly encoded with a computer program product for processing a video game, progress of the video game being controlled by causing an image display apparatus to display a player character on an image display screen of the image display apparatus, an action of the player character being controlled in accordance with operations by a player, the computer program product causing a computer to execute:

adding a predetermined time point to an accumulated time point value in accordance with a lapse of time, the accumulated time point value being at most equal to a maximum time point value;

displaying, on the image display screen, the accumulated time point value and the maximum time point value;

receiving, in accordance with the operations by the player, a specification of a special effect, the special effect corresponding to a special effect value;

storing, in a receiving special effect memory, the special effect in correspondence with the special effect value;

subtracting the special effect value from the maximum time point value when the specification of the special effect is received;

applying the special effect to the player character when the specification of the special effect is received;

displaying, on the image display screen, at least one selectable action command from among a plurality of action commands, each of the plurality of action commands corresponding to an action command value, the action command value of each of the at least one selectable action command being at most equal to a difference between the maximum time point value and an accumulated action command value;

receiving specification of at least one received action command from among the at least one selectable action command for specifying an action of the player character;

adding the action command value of the at least one received action command to the accumulated action command value when the specification of the at least one received action command is received;

storing, in an action command memory, the at least one received action command and a received order of the at least one received action command;

sequentially activating the at least one received action command in accordance with the received order for executing an action associated with the at least one action command when the accumulated time point value is at least equal to the action command value of the at least one received action command; and subtracting the action command value of the at least one received action command from the accumulated time point value and from the accumulated action command value when the at least one received action command is activated.

12. A computer-readable medium tangibly encoded with a computer program product for processing a video game, progress of the video game being controlled by causing an image display apparatus to display a player character on an image display screen of the image display apparatus, and controlling an action of each character to be displayed on the image display screen in accordance with operations by a player, the computer program product causing a computer to execute:

adding a predetermined time point to an accumulated value of the time point in accordance with lapse of time;

causing the image display apparatus to display the accumulated value of the time point and an accumulated maximum value of the time point on the image display screen;

receiving specification of a special effect on condition that the accumulated maximum value of the time point is caused to be lowered, the special effect being applied to the player character;

storing the received special effect and a special effect applied value in a received special effect memory so that the received special effect corresponds to the special effect applied value, the special effect applied value being set to the special effect;

subtracting the special effect applied value stored in the received special effect memory as the specific effect applied value set to the received special effect from the accumulated maximum value of the time point when the specification of the special effect is received;

applying a special effect applier that renews a status of the player character for applying the special effect such as attacking power-up, defending power-up to the player character when the specification of the special effect is received;

selecting an action command having an action command value less than a subtracted value obtained by subtracting an accumulated value of the action command values of the received action commands from the accumulated maximum value of the time point;

displaying at least one of selected action commands on the display screen as a list;

receiving an action command capable of receiving an indication of the action command indicating the action of the player character;

storing the received action command, in an action command memory, an action command value set to the action command and a received order of the action command so as to correspond to each other;

receiving an instruction to reserve activation of action commands on the basis of operations of the player;

setting reservation to activate at least one action command that has not been reserved to activate yet among stored action commands when the instruction to reserve activation of the action commands is received;

monitoring the accumulated value of the time point, and activating the at least one action command or a special action command of the at least one action command when the time point is stored in the action command memory and the accumulated value of the time point is at least equal to the accumulated value of the action command value of the at least one action command whose activation reserving order is the earliest among the action commands that have already reserved to activate, the special action command being determined in accordance with a combination of the at least one action command for executing the action associated with the special action command by the player character; and subtracting the action command value, stored in the action command memory as the action command value of the activated at least one action command, from the time point when the at least one action command is activated.

* * * * *